United States Patent
Grbo et al.

(10) Patent No.: US 9,252,661 B2
(45) Date of Patent: Feb. 2, 2016

(54) METHODS AND DEVICES FOR POWER SUPPLY CONTROL

(75) Inventors: Zeljko Grbo, Novi Sad (RS);
Aleksandar Prodic, Toronto (CA);
Francesco Carobolante, San Diego, CA (US)

(73) Assignee: QUALCOMM Inc., San Diego, CA (US)

(*) Notice: Subject to any disclaimer, the term of this patent is extended or adjusted under 35 U.S.C. 154(b) by 532 days.

(21) Appl. No.: 13/078,798

(22) Filed: Apr. 1, 2011

(65) Prior Publication Data

US 2012/0249093 A1 Oct. 4, 2012

(51) Int. Cl.
*H02M 3/156* (2006.01)
*H02M 3/158* (2006.01)
*H02M 3/157* (2006.01)
*H02M 1/00* (2007.01)

(52) U.S. Cl.
CPC ............ *H02M 3/156* (2013.01); *H02M 3/1588* (2013.01); *H02M 3/157* (2013.01); *H02M 2001/0003* (2013.01); *Y02B 70/1466* (2013.01)

(58) Field of Classification Search
CPC ..... H02M 3/156; H02M 3/157; H02M 3/158; H02M 3/1588; H02M 2001/0003
USPC ................... 323/282, 283, 285–287
See application file for complete search history.

(56) References Cited

U.S. PATENT DOCUMENTS

| | | | |
|---|---|---|---|
| 6,064,187 A | 5/2000 | Redl et al. | |
| 6,396,250 B1* | 5/2002 | Bridge | 323/283 |
| 6,518,738 B1* | 2/2003 | Wang | 323/284 |
| 6,861,826 B2* | 3/2005 | Lynch | 323/224 |
| 6,914,420 B2* | 7/2005 | Crocker | 323/282 |
| 7,504,812 B2* | 3/2009 | Riehl | 323/283 |
| 7,508,181 B2* | 3/2009 | Chen et al. | 323/282 |
| 7,576,527 B1* | 8/2009 | Zhang et al. | 323/284 |
| 7,716,001 B2 | 5/2010 | Lee et al. | |
| 7,902,800 B2* | 3/2011 | Jain et al. | 323/224 |
| 8,339,112 B2* | 12/2012 | Rua et al. | 323/222 |
| 2005/0046401 A1* | 3/2005 | Inn et al. | 323/282 |
| 2005/0127881 A1 | 6/2005 | Sase et al. | |
| 2009/0195230 A1* | 8/2009 | Adkins et al. | 323/282 |
| 2010/0033145 A1* | 2/2010 | Tseng et al. | 323/282 |
| 2010/0270995 A1* | 10/2010 | Laur et al. | 323/285 |

FOREIGN PATENT DOCUMENTS

| | | |
|---|---|---|
| CN | 1691478 A | 11/2005 |
| ES | 2335963 A1 | 4/2010 |

(Continued)

OTHER PUBLICATIONS

International Search Report and Written Opinion—PCT/US2012/031715—ISA/EPO—Jan. 28, 2013.

(Continued)

*Primary Examiner* — Fred E Finch, III
(74) *Attorney, Agent, or Firm* — James T. Gutierrez

(57) ABSTRACT

Exemplary embodiments are directed to a power controller. A method may include comparing a summation voltage comprising a sum of an amplified error voltage and a reference voltage with an estimated voltage to generate a comparator output signal. The method may also include generating a gate drive signal from the comparator output signal and filtering a signal coupled to a power stage to generate the estimated voltage.

25 Claims, 29 Drawing Sheets

(56) References Cited

FOREIGN PATENT DOCUMENTS

| JP | 2000299978 A | 10/2000 |
|---|---|---|
| JP | 2002016451 A | 1/2002 |
| JP | 2004110282 A | 4/2004 |
| JP | 2005184870 A | 7/2005 |
| WO | 2008061064 A1 | 5/2008 |
| WO | 2011058203 A2 | 5/2011 |

OTHER PUBLICATIONS

Feng G., et al., "A New Digital Control Algorithm to Achieve Optimal Dynamic Performance in DC-to-DC Converters", IEEE Transactions on Power Electronics, Jul. 1 2007, vol. 22 (4), pp. 1489-1498.

Feng G., et al., "A New Digital Control Algorithm to Achieve Optimal Dynamic Performance in DC-to-DC Converters," Proceedings of Power Electronics Specialist Conference, 2005, pp. 2744-2748.

Feng G., et al., "High Performance Digital Control Algorithms for DC-DC Converters Based on the Principle of Capacitor Charge Balance," Proceedings of Power Electronics Specialist Conference, Jun. 18-22, 2006, pp. 1740-1743.

Krein P.T., "Feasibility of Geometric Digital Controls and Augmentation for Ultrafast Dc-Dc converter Response," Proceedings of IEEE Workshop on Computers in Power Electronics, 2006, pp. 48-56.

Leung K.K.S., et al., "A Comparative Study of the Boundary Control of Buck Converters Using First- and Second-Order Switching Surfaces—Part I: Continuous Conduction Mode," IEEE Transactions on Power Electronics, Proceedings of Power Electronics, Proceedings of Power Electronics Specialist Conference, 2005, pp. 2133-2139.

Leung K.K.S., et al., "A Comparative Study of the Boundary Control of Buck Converters using First-and Second-Order Switching Surfaces—Part I: Continuous Conduction Mode," Proceedings of Power Electronics Specialist Conference, 2005, pp. 2126-2132.

Leung K.K.S., et al., "Derivation of a Second-Order Switching Surface in the Boundary Control of Buck Converters," IEEE Power Electronics Letters, Jun. 2004, vol. 2 (2), pp. 63-67.

Leung K.K.S., et al., "Dynamic Hysteresis Band Control of the Buck Converter With Fast Transient Response," IEEE Transactions on Circuits and Systems-II: Express Briefs, Jul. 2005, vol. 52 (7), pp. 398-402.

Meyer E., et al., "An Optimal Control Method for Buck Converters Using a Practical Capacitor Charge Balance Technique," IEEE Transactions on Power Electronics, Jul. 2008, vol. 23 (4), pp. 1802-1812.

Miftakhutdinov R., "Analysis and Optimization of Synchronous Buck Converter at High Slew-Rate Load Current Transients," IEEE 31st Annual Power Electronics Specialists Conference, Jun. 18-23, 2000, vol. 2, pp. 714-720.

Ordonez M., et al., "Selection of a Curved Switching Surface for Buck Converters," IEEE Transactions on Power Electronics, Jul. 2006, vol. 21 (4), pp. 1148-1153.

Ramanaryanan V., et al., "Sliding-ModControl of Power Converters," California Institute of Technology, General Motors Corp., et al., ISSN 0019-4964, May-Jun. 1989, vol. 69, pp. 193-211.

Redl R., et al., "Optimizing the Load Transient Response of the Buck Converter," Thirteenth Annual Applied Power Electronics Conference and Exposition, Feb. 15-19, 1998, vol. 1, pp. 170-176.

Yousefzadeh V., et al., "Proximate Time-Optimal Digital Control for Synchronous Buck DC-DC Converters," IEEE Transactions on Power Electronics, Jul. 2008, vol. 23 (4), pp. 2018-2026.

Zhao Z., et al., "Continuous-Time Digital Controller for High-Frequency DC-DC Converters," IEEE Transactions on Power Electronics, Mar. 2008, vol. 23 (2), pp. 564-573.

* cited by examiner

Valley Point Time Error vs. RC Mismatch

METHODS AND DEVICES FOR POWER SUPPLY CONTROL

BACKGROUND

1. Field

The present invention relates generally to power supplies, and more specifically, to systems, device, and methods related to controllers of a switch-mode power supply.

2. Background

With regard to switch-mode power supply controllers, fast recovery from load transients, minimizing output filter size, and simple implementation are of key importance. These issues are especially important in low-power, high-volume systems supplying mobile devices, consumer electronics, and numerous other applications consuming power from a fraction of watt to several hundreds of watts. Conventional hysteretic implementations suffer from large current stress, as well as stability related problems caused by overly large energy inertia. Furthermore, although time-optimal controllers result in improved responses, the hardware required for the implementation of such systems is overly expensive for the targeted cost-sensitive systems. As a consequence, pulse-width modulated (PWM) controllers implementing linear control laws are predominantly used, even though they exhibit significantly slower dynamic response and, consequently, require significantly large filtering components.

A need exists for enhanced methods, systems, and devices related to control of a power supply.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Figure 1:
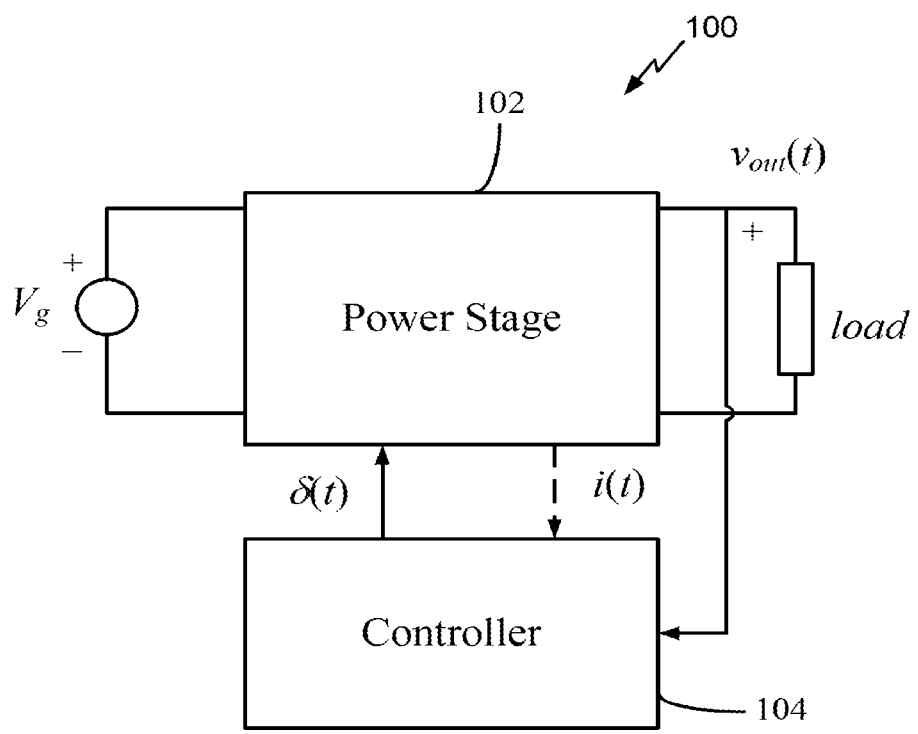
FIG. 1 is a block diagram of a switch-mode power supply.

FIG. 1 illustrates a conventional switch-mode power supply (SMPS) 100 including a power stage 102 and a controller 104. As will be understood by a person having ordinary skill in the art, with regard to switch-mode power supplies, fast recovery from load transients, minimizing output filter size, and simple controller implementation are of key importance. These issues are especially important in low-power, high-volume systems supplying mobile devices, consumer electronics, and numerous other applications consuming power from a fraction of watt to several hundreds of watts.

As alternatives to predominantly used voltage mode pulse-width modulation (PWM) controllers implementing linear proportional-integral (PI) or proportional-integral-derivative (PID) control laws, numerous solutions for developing a controller having improved transient response have been proposed. Namely, various hysteretic and time-optimal controller architectures, resulting in simplified implementation and improved load transient response times, respectively, have been reported. Hysteretic controllers have proven to be a hardware-efficient solution for obtaining fast transient response with a small number of components. Realization of such a controller usually requires a hysteretic comparator and, in some cases, additional circuitry for frequency regulation, which can be done through threshold variation or through variation of the sampling rate. The main drawback of conventional hysteretic implementations is overly large current stress, requiring overdesign of the semiconductor switches and filtering components, as well as stability related problems caused by overly large energy inertia.

Furthermore, proximity time-optimal controllers have been proposed in hopes of achieving steady state in a single on-off switching action (i.e., fast recovery time). Initially, time-optimal systems were developed as analog solutions, using a second order switching surface (i.e., geometric control principles), which can be also relate to sliding mode control. The switching surface based controller defines a path for one or more state variables (in accordance with possible combinations of the state values) of the controlled object (i.e., switching power converter), and accordingly forces the states to follow the path. The simplest example of a first order switching surface controller is a hysteretic controller, where the state of the output voltage is dictated by the reference value of a comparator. In second order systems, in addition to the output voltage, inductor current is also often controlled. The controlled inductor current is either directly measured or estimated by measuring the output capacitor current or voltage.

Even though second order switching surface based controllers were proposed many years ago, they have not been widely adopted. This is mostly due to the complexity of algorithms required for their implementation, making the controllers unsuitable for analog realization, which has been predominant in low-power dc-dc converters. Recent progress in the digital control of low-power dc-dc converters has enabled development of switching surface based controller prototypes, nearly resulting in the time-optimal response. The same progress has also allowed for the development of alternative control algorithms for obtaining time-optimal response, based on capacitor charge balance principle.

Figures 2A, 2B:
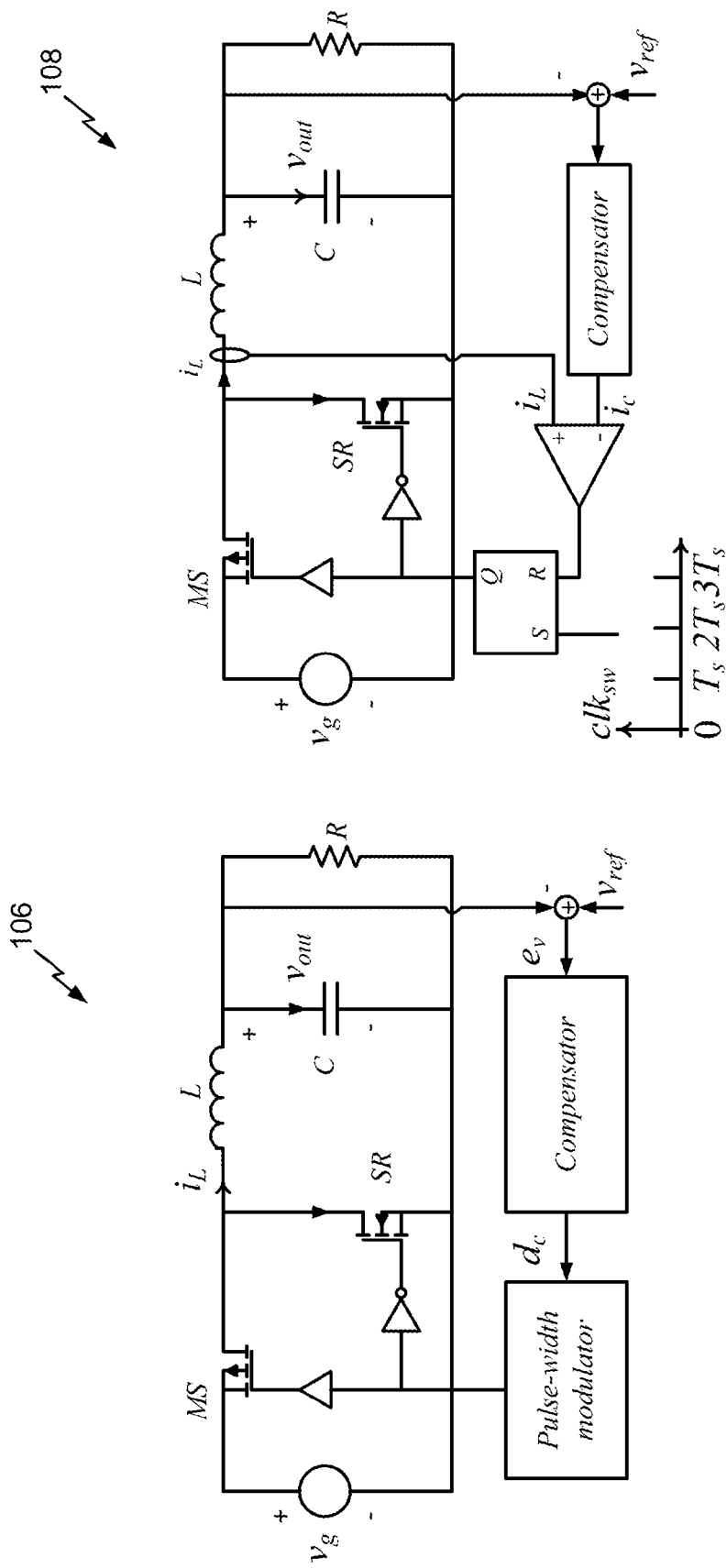
FIG. 2A illustrates a conventional controller within a switch-mode power supply.
FIG. 2B illustrates a conventional controller within a switch-mode power supply.

Further, although the presented time-optimal controllers result in improved responses (i.e., drastically reduce the output filter size), they have not been widely adopted in low-power dc-dc systems. Hardware required for the implementation of such systems is overly expensive for the targeted cost-sensitive systems. As a consequence, pulse-width modulated (PWM) controllers, similar to PWM controllers 106 and 108 shown in FIG. 2, are still predominantly used. Even though they exhibit significantly slower dynamic response and, consequently, require significantly large filtering components (i.e., the power inductor L and the output capacitor C), PWM controllers are a preferable solution due to the simplicity of their implementation.

Various exemplary embodiments of the present invention, as described herein, relate to systems, devices, and methods for control within a switch-mode power supply. It is noted that the embodiments of the present invention are applicable to many power conversion topologies as well as non-linear or switched-mode amplification of signals. Exemplary embodiments, as described herein, may provide a hardware efficient control solution that improves transient response times (i.e., improve system dynamics). A controller, in accordance with an exemplary embodiment, may be implemented with hardware that is comparable or even simpler than that needed for voltage-mode PWM realization or Class D amplification. Furthermore, exemplary embodiments may reduce SMPS electromagnetic interference (EMI), which may be an extremely important feature in numerous noise-sensitive applications.

Figure 3:
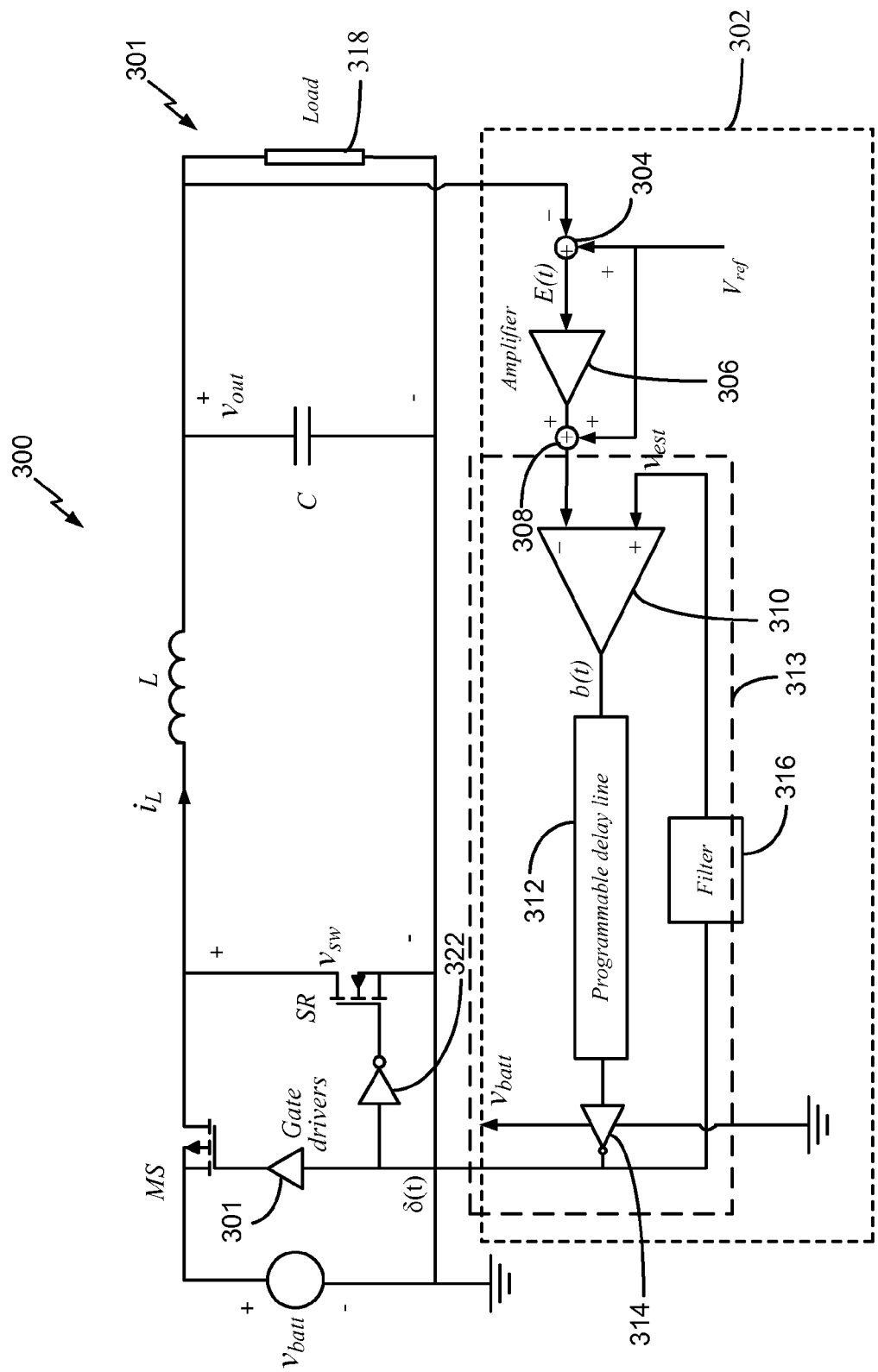
FIG. 3 illustrates a converter coupled to a controller, according to an exemplary embodiment of the present invention.

FIG. 3 illustrates a device 300 including a controller 302 and a power stage 301, according to an exemplary embodiment of the present invention. Controller 302, which may be referred to herein as a one-bit controller, includes an adder 304, an amplifier 306, an adder 308, a comparator 310, a programmable delay line 312, a inverter 314, and a low-pass filter 316. By way of example, low-pass filter 316 may comprise a first order low pass filter. Power stage 301 comprises an input voltage Vbatt, an inductor L, a capacitor C, a load 318, a first transistor MS (i.e., main switch), a second transistor SR (synchronous rectifier), gate drivers 320 and 322, and an output voltage Vout.

As illustrated in FIG. 3, adder 304 is configured to receive each of a reference voltage Vref and output voltage Vout, and, in response thereto, output an error signal E(t). Amplifier 306 is configured to amplify error signal E(t), which is then received by adder 308. It is noted that amplifier 306 may reduce the error within device 301. It is noted that amplifier 306 may be omitted (i.e., the gain is equal to 1) if the error is tolerable by the application. Adder 308 also receives reference voltage Vref, and, in response thereto, outputs a voltage Vcmp, which is provided to an inverting input of comparator 310. A non-inverting input of comparator 310 is configured to receive an estimated voltage Vest, which is output from low-pass filter 316. A signal b(t) output from comparator 310 is provided to programmable delay line 312 and an output of programmable delay line 312 is provided to inverter 314. Inverter 314 is configured to convey a signal δ(t), which is received by low-pass filter 316.

It is noted that programmable delay line 312, inverter 314, comparator 310, and filter 316 form an emulator 313 of the power stage where, in steady state, the signal at the output of filter 316 (i.e., $V_{est}$) is substantially the same as output voltage $V_{out}$. One difference between emulator 313 and power stage 301, which, in this case, is a second order system, is that emulator 313 has a lower order dynamic, allowing simplified regulation of estimated voltage $V_{est}$ and, consequently, output voltage $V_{out}$ at the desired reference voltage $V_{ref}$. Different implementation of this portion of the circuit can be accomplished, as long as the final equation representing the combination of the terms remains consistent (i.e., one term could be added to the other input of the comparison with inverted sign, etc.). In this implementation, estimated voltage $V_{est}$ is substantially similar to the desired output voltage, kept at that level by a loop consisting of comparator 310 and delay line 312; a different ratio of reference voltage, estimator output and converter output voltages can be obtained by properly scaling the variables. Delay line 312 may be configured to determine comparator triggering latency and, consequently, the oscillation frequency of the loop (i.e., the converter switching frequency).

It is further noted that signal δ(t) output from inverter 314 has substantially the same duty ratio as output b(t) of comparator 310, and an amplitude equal to input voltage $V_{batt}$ providing feedforward for emulator 313. According to one exemplary embodiment, a waveform of signal δ(t) is substantially similar to a switching voltage $V_{sw}$ of power stage 301. The waveform of signal δ(t) may be affected by both emulator 313 and disturbances of output voltage Vout. In steady state (i.e., when the difference between Vout and Vref is substantially zero), the duty ratio of signal δ(t) is determined entirely by emulator 313. During load transients and other disturbances that change a value of output voltage $V_{out}$, a duty ratio signal δ(t) may also be influenced by error signal E(t), which represents the difference between the desired, reference voltage $V_{ref}$ and the actual value of output voltage $V_{out}$. As soon as a non-zero error occurs, error signal E(t) is amplified and added to the inverting input of the comparator 310. As a result, compensator latency, which may exist in conventional controllers, due to integral action, may be eliminated, the duty ratio of signal δ(t) is affected, and substantially instantaneous reaction to disturbances (i.e., fast recovery of the output voltage), is achieved. It is noted that, although not required, delay line 312 fine tunes the self-oscillating frequency of controller 302. It is further noted that controller 302 may comprise a single pole system, which is intrinsically stable. As will be appreciated by a person having ordinary skill in the art, controller 302 may be faster than systems including a compensator.

Figure 4:
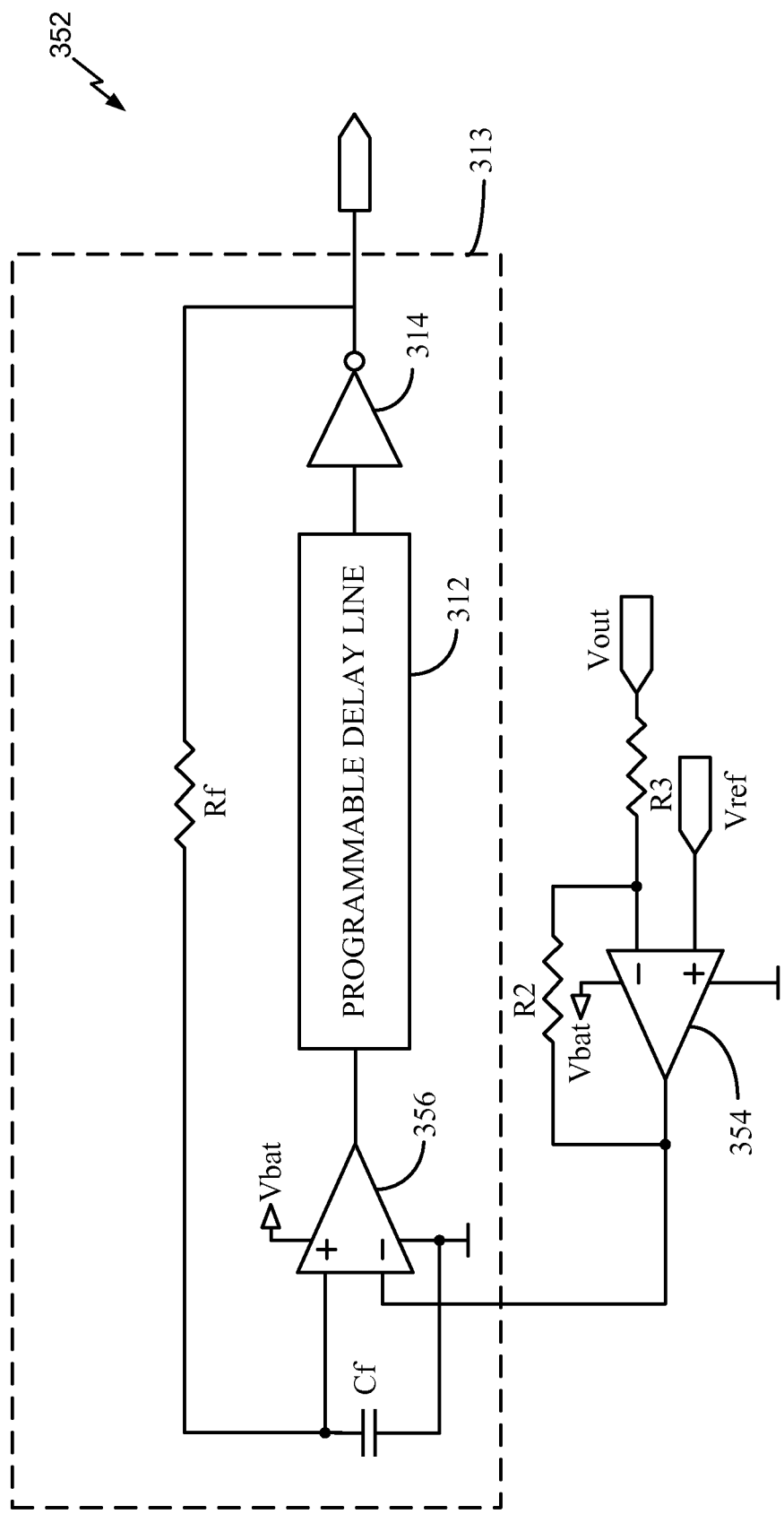
FIG. 4 illustrates a controller, in accordance with an exemplary embodiment of the present invention.

FIG. 4 illustrates a controller 352, which is one contemplated implementation of controller 302 shown in FIG. 3. As illustrated in FIG. 4, controller 352 comprises a filter (i.e., low-pass filter 316) comprising resistor Rf and capacitor Cf, a first amplifier 354 and a second amplifier 356. Controller 352 further includes programmable delay line 312 having an output coupled to inverter 314. Moreover, output voltage $V_{out}$ and reference voltage $V_{ref}$ may be coupled to first amplifier 354 and an output of inverter 314 may be provided to a gate driver of a power stage (e.g., power stage 301). Controller 352 may further include means of amplification 354, which may be implemented with an operational amplifier as shown, or other means, and may be simply a summing input of the comparator 356, if no amplification is necessary. As non-limiting examples, resistor Rf may comprise a 1 K ohm resistor, resistor R2 may comprise a 1 M ohm resistor, resistor R3 may comprise a 100 K ohm resistor, and capacitor Cf may comprise a 2 nF capacitor.

As described above, an operation of controller 302 in steady state may be regulated by a feed-forward regulated oscillator with a digitally programmable delay line 312 that, together with an RC filter 316, forms emulator 313 of the power stage.

Figure 5:
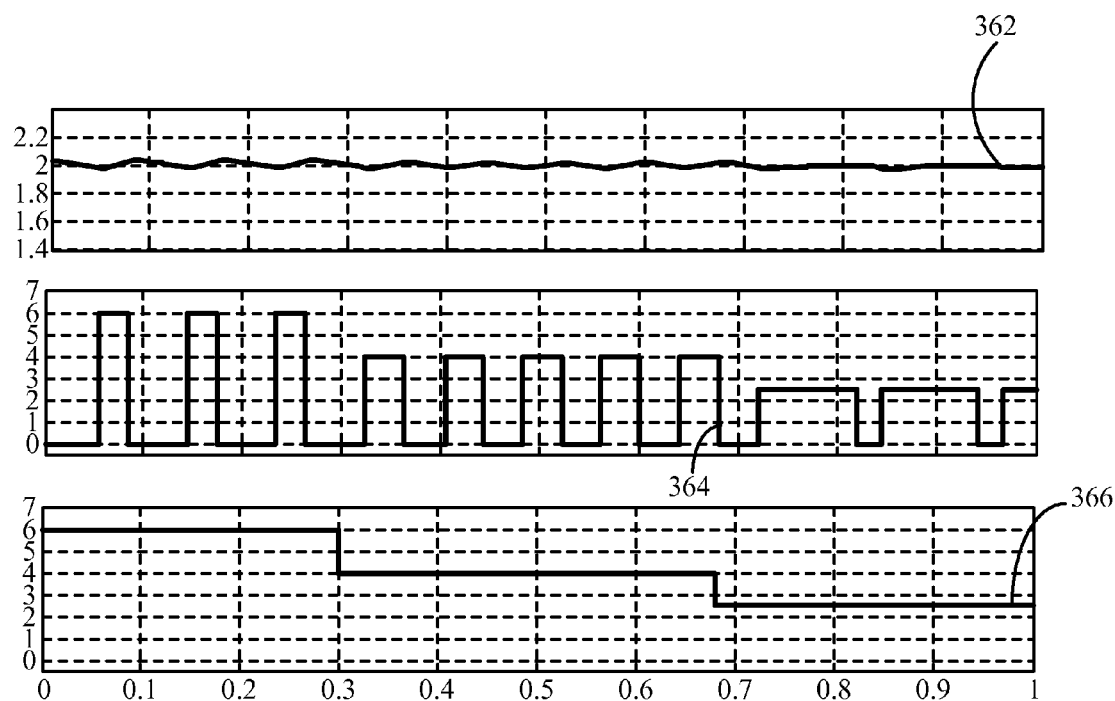
FIGS. 5-10 illustrate simulation results of a controller, in accordance with an exemplary embodiment of the present invention.
Figure 6:
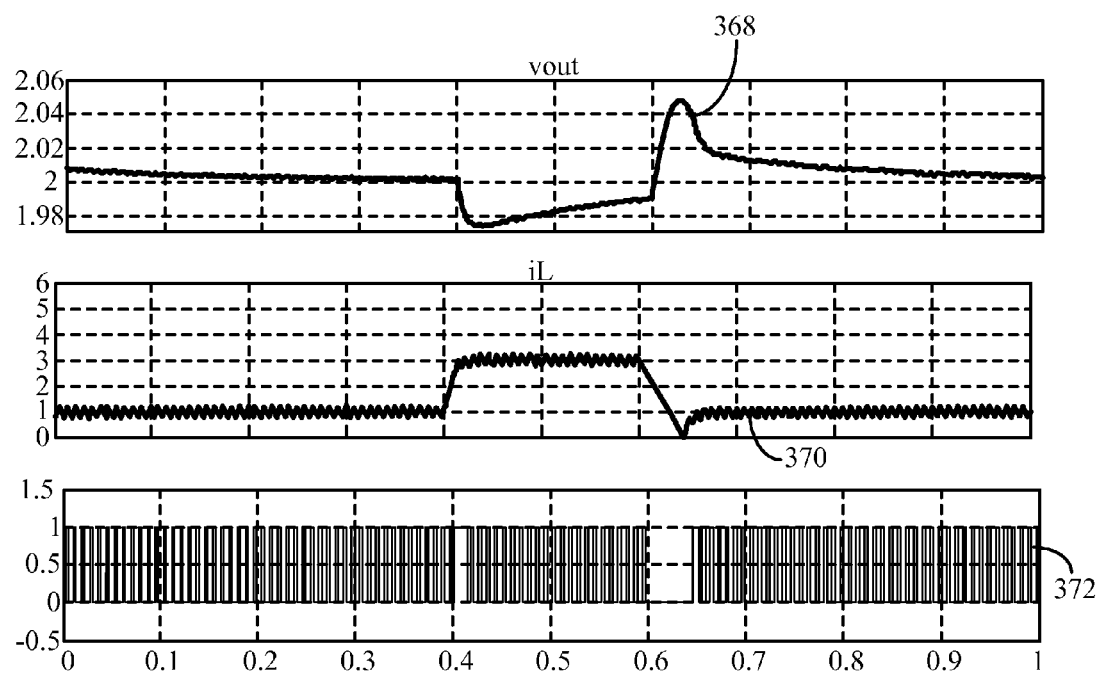

Simulation results of a model (not shown) of device 300, wherein inductor L of power stage 301 comprises 0.3 µH and capacitor C of power stage 301 comprises 4.7 µF, are shown in FIGS. 6-10. With reference to FIGS. 3, 4, and 5, a waveform 362 of represents a voltage at capacitor Cf of filter 316, a waveform 364 represents signal δ(t), and a waveform 366 represents input voltage $V_{batt}$. It is noted that the output of the low-pass filter (i.e., $V_{est}$), which is depicted by signal 362, has a value which approximates the output voltage Vout as well as the average voltage at the switching node (i.e., voltage $V_{swt}$).

Figure 7:
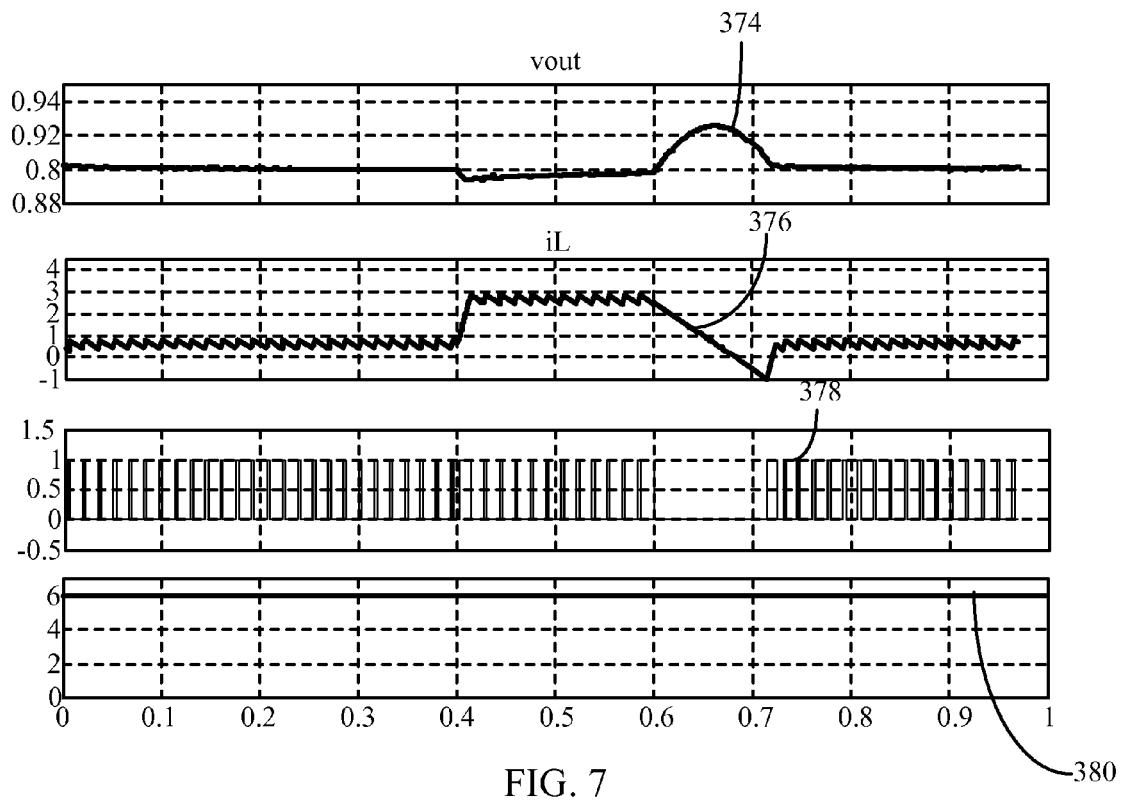

FIGS. 6 to 9 demonstrate load transient responses of controller 302 for several various output capacitor and input voltage values, including a case wherein input voltage $V_{batt}$ is slightly higher than output voltage $V_{out}$, making inductor slew rate very small. Specifically, FIG. 7 illustrates simulation results of a 6 V to 2V buck converter for load changes between 1 A and 3 A and a value of power stage output capacitor (i.e., capacitor C) of 4.7 µF. With reference to FIGS. 3, 4, and 7, a waveform 368 represents output voltage $V_{out}$, a waveform 370 represents a current in inductor L, and a waveform 372 represents signal δ(4

Figure 8:
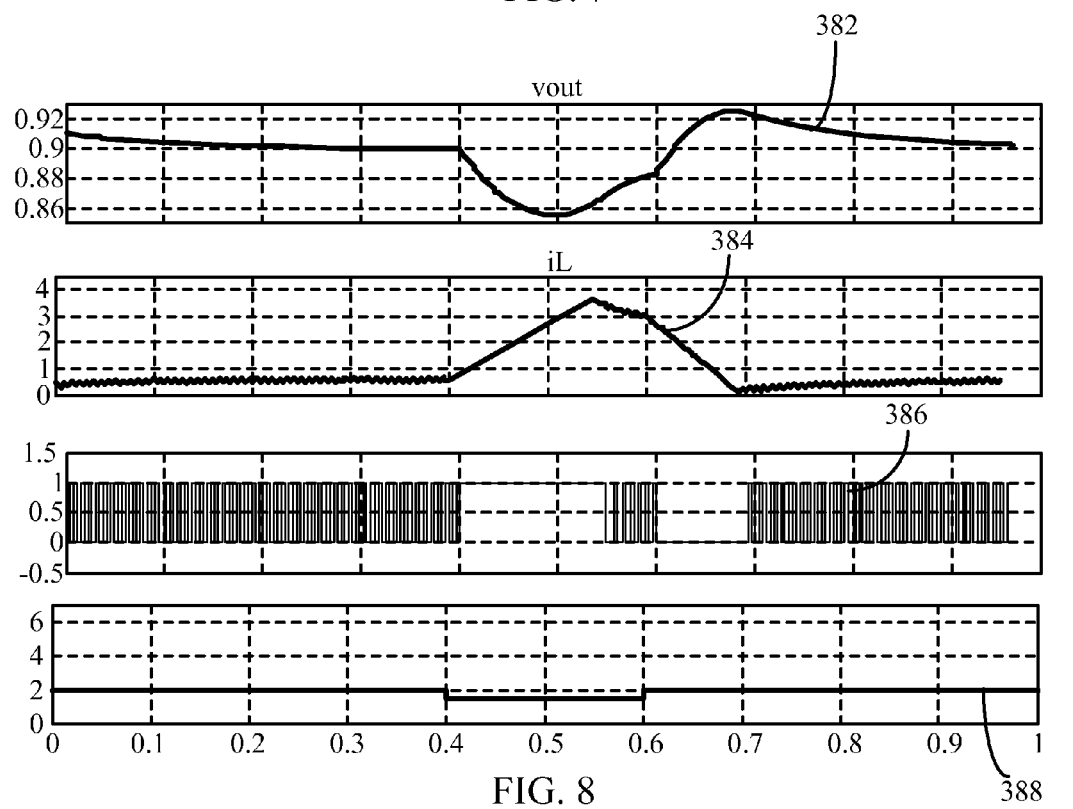
Figure 9:
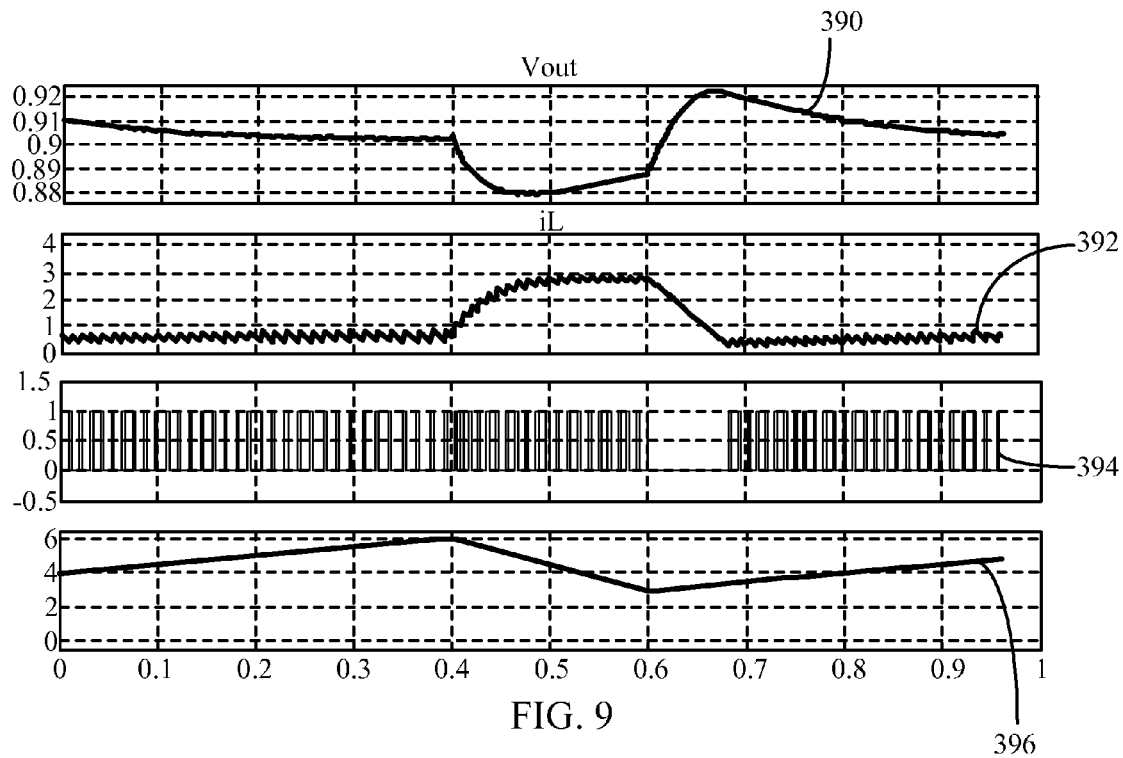
Figure 10:
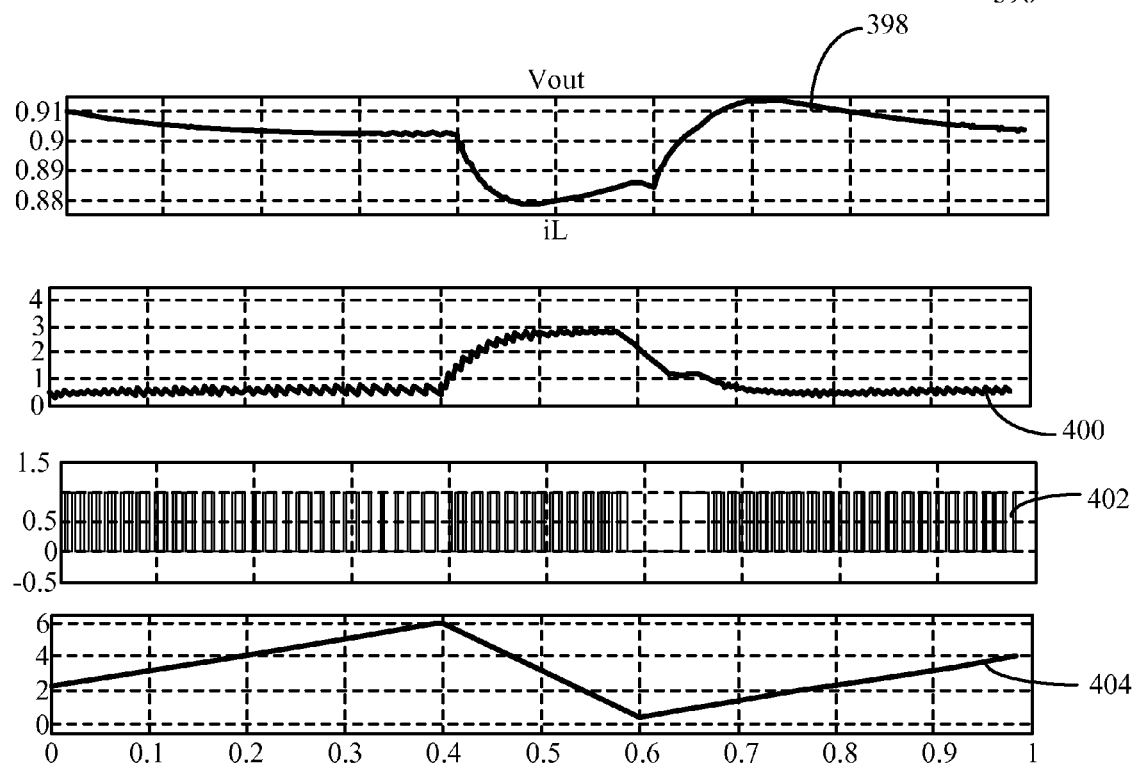

FIG. 7 illustrates simulation results of a 6 V to 0.9V buck converter for load changes between 0.68 A and 2.68 A and a value of a power stage output capacitor (i.e., capacitor C) of 22 µF. With reference to FIGS. 3, 4, and 7, a waveform 374 represents output voltage $V_{out}$, a waveform 376 represents a current in inductor L, a waveform 378 represents signal δ(t), and a waveform 380 represents input voltage $V_{batt}$. FIG. 8 illustrates simulation results of a buck converter for step input voltage changes between 2V and 1.5V. With reference to FIGS. 3, 4, and 8, a waveform 382 represents output voltage $V_{out}$, a waveform 384 represents a current in inductor L, a waveform 386 represents signal δ(t), and a waveform 388 represents input voltage $V_{batt}$. FIG. 9 illustrates simulation results of a buck converter for linear input voltage changes between 3V and 6V. With reference to FIGS. 3, 4, and 9, a waveform 390 represents output voltage $V_{out}$, a waveform 392 represents a current in inductor L, a waveform 394 represents signal δ(t), and a waveform 396 represents input voltage $V_{batt}$. FIG. 10 illustrates simulation results of a 0.9V buck converter for input voltage $V_{batt}$ changes between 0.5V and 6V, including under-voltage conditions. With reference to FIG. 10, a waveform 398 of represents output voltage $V_{out}$, a waveform 400 represents a current in inductor L, a waveform 402 represents signal δ(t), and a waveform 404 represents input voltage $V_{batt}$.

During transients, amplifier 306 may substantially instantaneously change the non-inverting input of comparator 310 causing substantially immediate action of controller 302 and the suppression of the transient. As will be appreciated by a person having ordinary skill in the art, controller 302 may recover to steady state through a single on-off switching action. It is noted that the demonstrated transient response is comparable to that of other proximal time-optimal solutions and has no significant current overshoots, which may exist in hysteretic implementations. The results of the simulations illustrated in FIGS. 8-10 verify that controller 302 may be able to quickly compensate for disturbance in input voltage $V_{batt}$. The simulations further illustrate that controller 302 is able to recover from under voltage conditions when, over a brief period, input voltage $V_{batt}$ drops below output voltage Vout.

Selection of components within power stage 301 will now be described. It is noted that the following description related to selection of power stage components is provided as an example and exemplary embodiments may comprise any suitable components. It is noted that for device 300, current and voltage overshoots may depend on physical constrains of power stage 301. Hence, the selection of the power stage components may be crucial for proper system design, minimizing overall size of the filtering components, and limiting the stress on the semiconductor and filter components. The selection is based on the energy balance criteria, where the maximum output voltage deviation and the maximum current stress (i.e., maximum inductor current difference) are taken as the design constrains. As the initial point in this analysis, the amount of energy loss $E_c$ during maximum allowable voltage deviation of capacitor C is given by:

$$E_c = \frac{1}{2}C(v_h^2 - v_l^2) \quad (1)$$

where, $v_h$ and $v_l$ are the maximum and minimum allowable output voltage (i.e., output voltage $V_{out}$) values, respectively.

During load transients, a voltage at capacitor C is recovered by providing the same amount of energy from inductor L, hence the energy balance equation becomes:

$$\frac{1}{2}L(i_h^2 - i_l^2) = \frac{1}{2}C(v_h^2 - v_l^2) \qquad (2)$$

where $i_h$ and $i_l$ are defined as the maximum and minimum currents through the inductor L, respectively.

For example, for a 6V to 2V buck converter, with a 2 A maximum load change and 150 mV overshoot during a heavy-to-light load transient, if inductor L has a value equal to 0.3 μH and capacitor C has a value equal to 3.9 μF, performance for the given constraints may be enhanced.

Selection of components of filter 316 and the propagation time of the delay line 312 of controller 302 will now be described. It is noted that the following description related to selection of filter components and the propagation time of the delay line 312 is provided as an example and exemplary embodiments may comprise any suitable components. It is noted that since a feedback loop that regulates steady state operation of converter 302 is closed around emulator 313, parameters of the feedback loop may dictate the switching frequency of converter 302. To simplify the analysis of the operation of emulator 313, small-ripple approximation and system linearization, as will be understood by a person having ordinary skill in the art, are applied. It is assumed that the switching frequency $f_{sw}=1/T_{sw}$ of converter 300 is significantly higher than the corner frequency (i.e., $f_{RC}=1/(2\pi RC_f)$) of filter 316 (e.g., $f_{sw}>10f_{RC}$) such that the ripple across capacitor Cf of FIG. 4 is negligible:

$$\Delta v_{est\_ripple} \ll V_{est} \approx V_{ref} \qquad (3)$$

Figure 11:
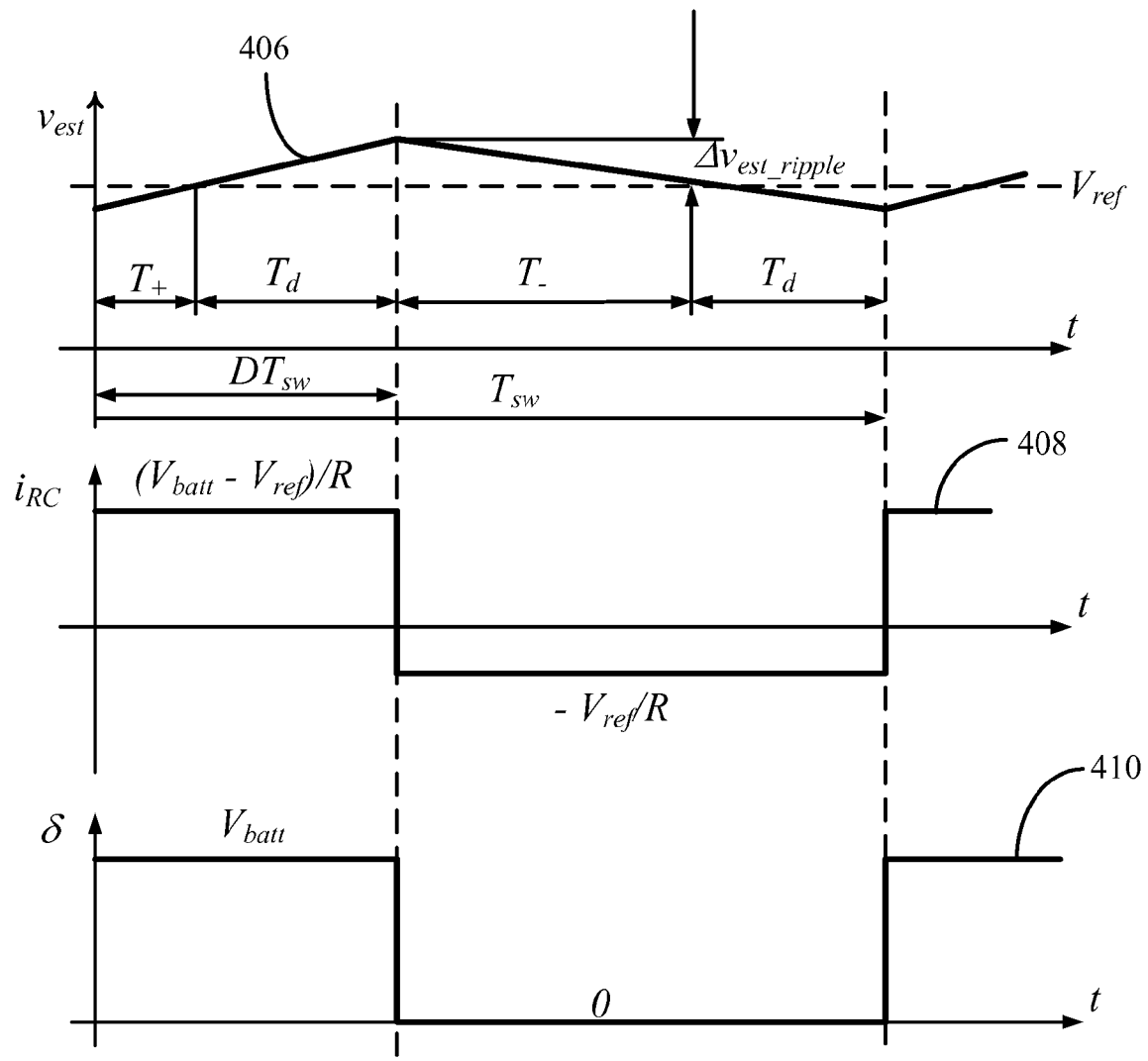
FIG. 11 illustrates waveforms associated with a controller, according to an exemplary embodiment of the present invention.

Under such assumptions, waveforms of emulator 313 in steady state may be approximated with those shown in FIG. 11. Each switching interval can be divided into parts, where $T_+$ is the time needed for a voltage at filter 316 to reach the threshold of the comparator 310 after a low-to-high transition of signal $\delta(t)$, $T_d$ is the propagation time of delay line 312, and $T_-$ is the time interval needed for the voltage at filter 316 to reach the threshold after a high-to-low transition of signal $\delta(t)$.

By looking at the waveforms and equating the expressions for the capacitor ripple for both portions of the switching interval, one may calculate $T_+$ and $T_-$ time intervals, and consequently the period of oscillations as follows:

$$\Delta v_{est\_ripple} = \frac{V_{batt} - V_{ref}}{RC_f}T_d = \frac{V_{ref}}{RC_f}T_- \qquad (4)$$

$$\frac{V_{batt} - V_{ref}}{RC_f}T_+ = \frac{V_{ref}}{RC_f}T_d \qquad (5)$$

Combining equations (4) and (5) gives expressions for $T_+$ interval $$T_+ = \frac{V_{ref}}{V_{batt} - V_{ref}}T_d \qquad (6)$$

Moreover, turn on time $t_{on}=DT_{sw}$, where D is the duty ratio of signal $\delta$, $$DT_{sw} = T_+ + T_d = \frac{V_{batt}}{V_{batt} - V_{ref}}T_d \qquad (7)$$

wherein the switching period $T_{sw}$ of the device 300 is defined as:

$$T_{sw} = DT_{sw}\frac{V_{batt}}{V_{ref}} = \frac{V_{batt}^2}{V_{ref}(V_{batt} - V_{ref})}T_d \qquad (8)$$

These equations illustrate how the key timing intervals depend on the circuit parameters and prove that the switching frequency of device 300 can be changed by varying the propagation time of delay line 312.

As an example, optimal gain calculation will now be described. To calculate the optimal gain of the device 300, time-domain analysis is combined with an energy balance principle. This may comprise a multi-step procedure that allows a designer to set the recovery time and peak/minimum inductor current during transient or, equivalently, the maximum output voltage deviation. The gain calculation procedure can be described as follows: In a first step, based on the size of the load transient, peak current limit, and the type of the transient, the variation in the on or off time of the main switch is calculated as:

$$\Delta T_{on/off} = L\frac{\Delta i_{load}}{v_L} \qquad (9)$$

where $\Delta i_L$ is the difference between initial and the peak/valley value of a current through inductor L during the transient and $v_L$ is the voltage across inductor L during that period. The peak inductor value can be selected such that saturation of the inductor core is avoided.

In a second step, the amount of change in the estimator's comparator voltage $V_{amp}$ (see FIGS. 3 and 4) required to create the previously defined time variation is calculated. This calculation is performed by adopting linear approximation described above. With reference to FIGS. 3 and 11, a waveform 406 represents output voltage $V_{out}$, a waveform 408 represents a current in filter 316, and a waveform 410 represents signal $\delta(t)$. It is noted that with reference to FIG. 12, the required change of the comparator voltage (i.e. the change across the estimator's capacitor Cf) is:

$$\Delta v_{cmp} = \frac{v_R}{R_f C_f}\Delta T_{on/off} \approx \frac{v_L}{R_f C_f}\Delta T_{on/off} \qquad (10)$$

wherein $V_R$ is the voltage across resistor R1. By combining equations (9) and (10), the following equation may be obtained:

$$\Delta v_{cmp} = L\frac{\Delta i_{load}}{R_f C_f} \qquad (11)$$

Figure 12:
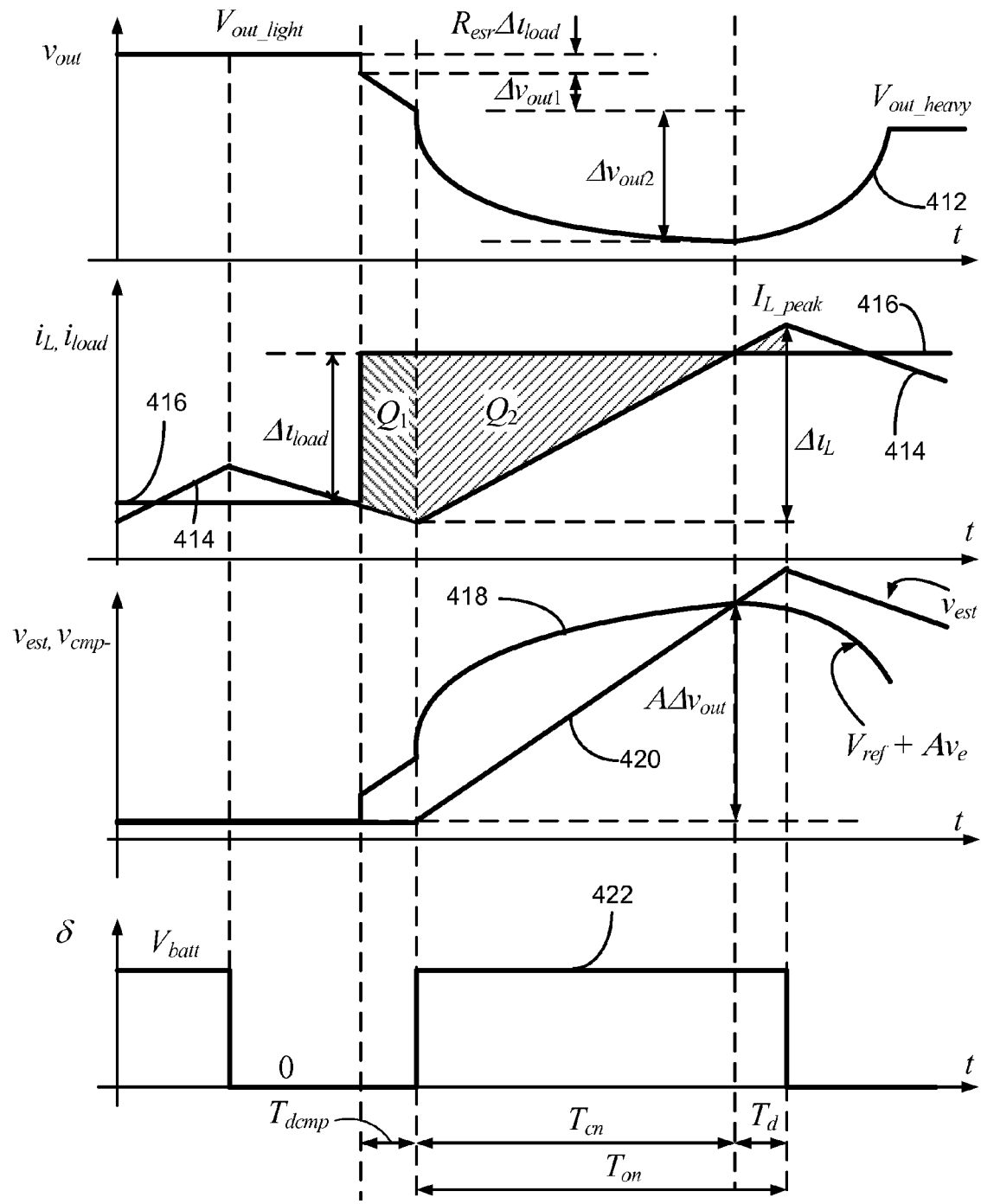
FIG. 12 illustrates waveforms associated with a buck power stage coupled to a controller, in accordance with an exemplary embodiment of the present invention.

Equation 11 illustrates the required change of a voltage of capacitor Cf of filter 316 needed to achieve the inductor current change of $\Delta i_L$ in a single on/off switching action. In another step, the gain of the error amplifier 306 is calculated as the ratio of voltage deviations of capacitor Cf and the output voltage Vout. Accordingly:

$$A = \frac{\Delta v_{cmp}}{\Delta v_{out}} \quad (12)$$

wherein $\Delta v_{out}$ is the output voltage deviation. Idealized transient power stage 301, controller 302, and RC filter 316 waveforms of FIG. 13 may be observed. With reference to FIGS. 3 and 12, a waveform 412 represents output voltage $V_{out}$, a waveform 414 represents a current through inductor L, a waveform 416 represents a current through load 318, a waveform 418 represents a voltage at an inverting input of comparator 310, a waveform 420 represents a voltage at a non-inverting input of comparator 310, and a waveform 422 represents signal δ(t).

It can be seen that that the output voltage deviation due to the load change $\Delta i_{load}$ comprises of three components, namely, the initial drop due to the current passing through the equivalent series resistance of the output capacitor C (i.e., $R_{esr} i_c$), a drop due to the delayed action of amplifier 306 and comparator 310 (i.e., $\Delta v_{out1}$), and the deviation caused by the delayed reaction of power stage 310 (i.e., $\Delta v_{out2}$). However, as explained herein, the resistance $R_{esr}$ caused voltage drop vanishes in time, as the capacitor current recovers to zero, and only the last two components influence the charge-balance based gain selection. $\Delta v_{out1}$ can be calculated as:

$$\Delta v_{out1} = \frac{Q_1}{C} \approx \frac{\Delta i_{load} T_{dcmp}}{C} \quad (13)$$

wherein $T_{dcmp}$ is combined delay of amplifier 306 and comparator 310.

The second component can be calculated as:

$$\Delta v_{out2} \approx \frac{Q_2}{C} = \frac{\Delta i_{load} T_{cn}}{2C} \quad (14)$$

wherein $T_{cn}$ is the time interval the inductor current needs to change from the initial to the new load value. For a light-to-heavy load change in a buck converter this time interval is:

$$T_{cn} \approx \frac{L}{V_{batt} - V_{out}} \Delta i_{load} \quad (15)$$

At the end of this interval, the output voltage error E(t) (FIGS. 3 and 4) is maximum, as well as the non-inverting input of comparator 310. It should be noted, that at this point, a current in capacitor C is substantially zero and, consequently, $R_{esr} i_c$ has no influence on the voltage drop. By combining equations (13) and (14) an equation for the maximum voltage drop may be obtained:

$$\Delta v_{out} \approx \frac{\Delta i_{load}}{C}(T_{dcmp} + T_{cn}/2). \quad (16)$$

In order to prevent premature triggering of the main switch, the amplified value of this error needs to be larger or equal to the deviation calculated in step 2 above. Accordingly:

$$A \approx \frac{LC}{RC_f(T_{dcmp} + T_{cn}/2)} \quad (17)$$

The waveforms of FIG. 12 also show that the peak current of inductor L is larger than the maximum current through load 318, due to the existence of an extra delay in the switching action $T_d$, caused by delay line 312. This equation also indicates that by increasing the gain A, the time constant of estimator 313 can be reduced, possibly allowing a full on-chip implementation.

As described above, the action of controller 302 is selected such that at the output voltage valley/peak point, time instant comparator 310 is triggered. Alternatively, instead at the valley point, the gain RCf product can be selected such that a maximum allowable current deviation $\Delta i_L$ is reached at the triggering point. In general, the selection based on the maximum current does not reduce voltage deviation but, in some cases, can result in a shorter recovery time.

Figure 13:
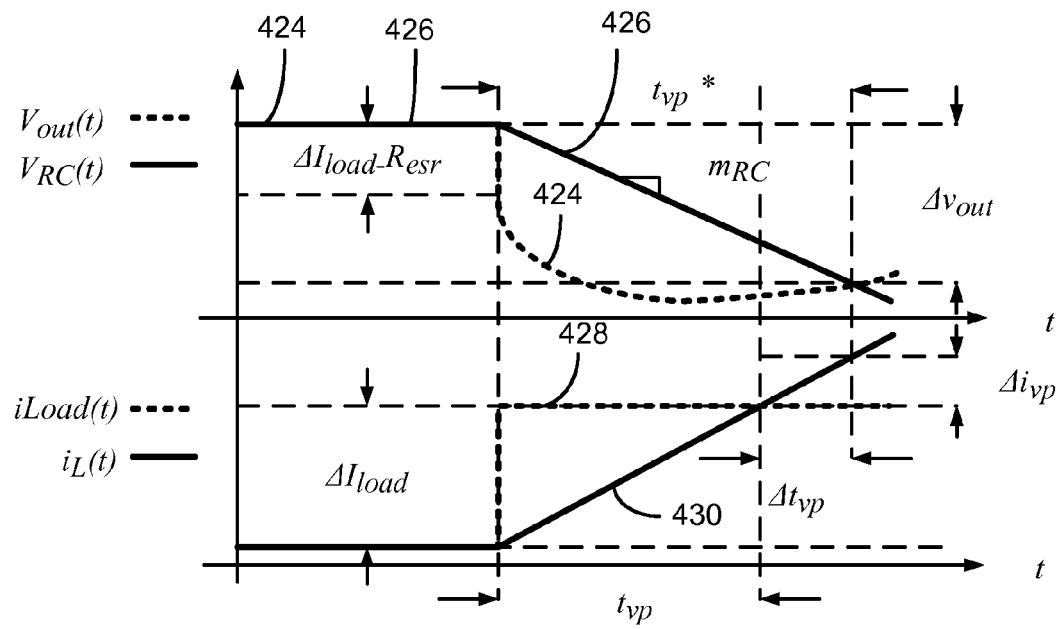
FIG. 13 illustrates additional waveforms associated with a controller, according to an exemplary embodiment of the present invention.

FIG. 13 illustrates the effect of a potential mismatch between LC and $RC_f$ constant, where the initial selection of the parameters is based on the valley point triggering. To simplify explanation, it is assumed that, during the initial response to a load transient, the propagation time of delay line 312 is reduced to zero and that the gain A=1.

With reference to FIGS. 3 and 13, a waveform 424 represents output voltage Vout, a waveform 426 represents error voltage E(t), a waveform 428 represents a current through load 318, and a waveform 430 represents a current through inductor L. In FIG. 13, $R_{esr}$ is the equivalent resistance of output capacitor C, $\Delta I_{load}$ is the load step value, $m_{RC}$ is the slope of the $RC_f$ emulator voltage error, $t_{vp}$ is the ideal time required to reach the triggering point where the inductor and load currents are the same, $t_{vp}^*$ is the actual estimator time required to reach the valley point, and $\Delta t_{vp}$ is the difference between the two times (i.e., the value of delay/lead in the triggering).

The consequence of this time-mismatch is that, at the triggering point, the inductor current and the load currents are not the same, resulting in a $\Delta i_{vp}$ difference. This effect is quantified through the following mathematical analysis. The AC value of the output voltage $V_{out}$ during transient is given by:

$$v_{out} = R_{esr} \cdot i_c + \frac{1}{C} \int i_c dt \quad (18)$$

wherein equation (18) is calculated to obtain the following expression for output voltage $V_{out}$:

$$v_{out} = V_{ref} + R_{esr} \cdot \left(-\Delta I_{load} + \frac{v_{in} - v_{out}}{L} \cdot t\right) + \quad (19)$$

$$\frac{1}{C} \cdot \left(-\Delta I_{load} \cdot t + \frac{v_{in} - v_{out}}{2L} \cdot t^2\right)$$

wherein $V_{ref}$ is the reference dc voltage, $v_{in}$ is the input voltage of device 300, and $i_c$ is the capacitor current $(-i_{Load}(t) - i_L(t))$.

The RC emulator circuit voltage is given by:

$$V_{RC} = V_{ref} - \frac{v_{in} - v_{out}}{R_f \cdot C_f} \cdot t \quad (20)$$

wherein Rf is the emulator resistance and Cf its capacitance.

By equating (19) and (20), the time required to reach the triggering point (i.e., where the output voltage and the emulator voltage cross) can be derived, as shown in the following equation:

$$0 = \frac{v_{in} - v_{out}}{2LC} \cdot t_{vp}^{*2} + \left(-\frac{\Delta I_{load}}{C} + \frac{v_{in} - v_{out}}{L} \cdot R_{esr} + \frac{v_{in} - v_{out}}{RC_f}\right) \cdot t_{vp}^{*} - R_{esr} \cdot \Delta I_{load} \quad (21)$$

On the other side, the ideal time required to the reach the valley point, calculated by looking at FIG. 13, is:

$$t_{vp} = \frac{\Delta I_{load}}{v_{in} - v_{out}} \cdot L \quad (22)$$

In the case of the ideal matching, i.e. $t_{vp}^*$ equal to $t_{vp}$, the $RC_f$ product can also be given by:

$$RC_f = \frac{2C \cdot (v_{in} - v_{out})}{\Delta I_{load}} \quad (23)$$

showing the ideal $RC_f$ constant for a given load step.

For the case when a gain is taken into account, this equation becomes:

$$ARC_f = \frac{2C \cdot (v_{in} - v_{out})}{\Delta I_{load}} \quad (24)$$

Figure 14:
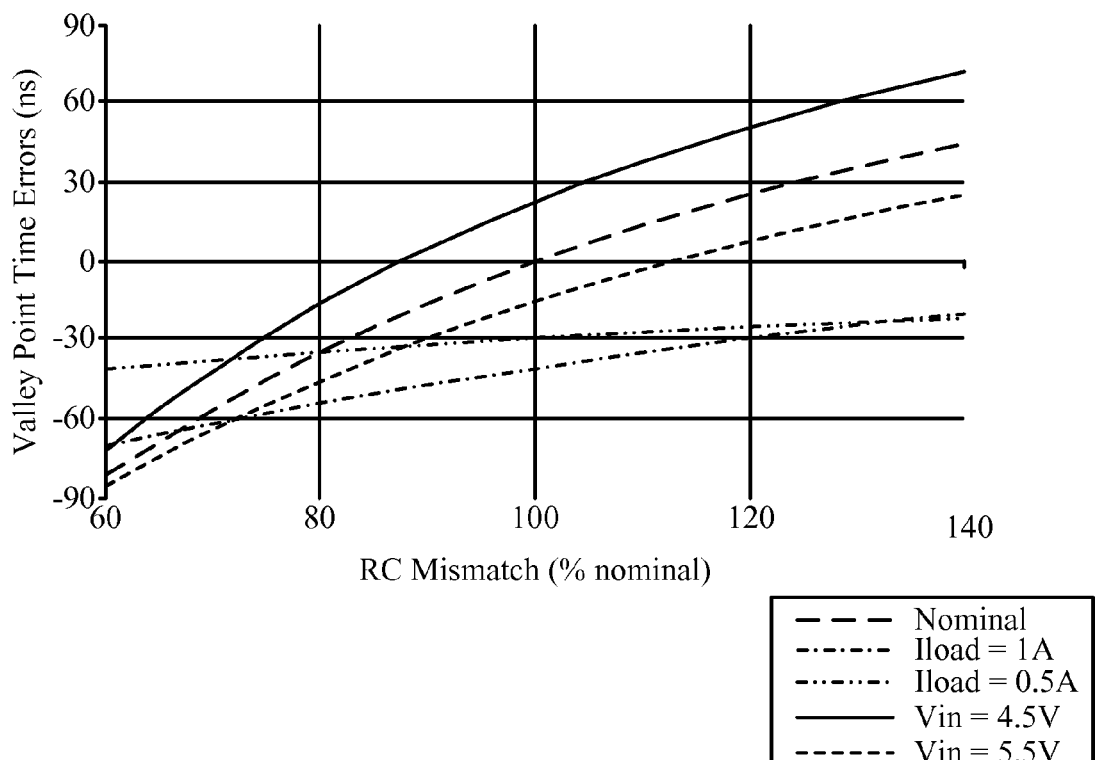
FIG. 14 illustrates a time error.

The analysis above shows that a change in the input voltage Vin/Vbatt, load step value, or output capacitance may introduce a sub-optimal RC emulator response. This dependence is quantified in FIG. 14 showing the triggering time delay error for a 5V to 1V buck converter, with a 20 uF output capacitor (i.e., capacitor C), and expected 2 A load step value. It should be noted that expressing the error through the triggering delay allows us to calculate a current overshoot to compared to the case of triggering at the $i_L = i_{load}$ point to be calculated for any given operating condition and inductance value.

It should be noted that the natural action of controller 302, to a large extent, compensates for any extreme error in the triggering point. This can be explained by looking at waveforms of FIG. 12. Due to convex nature of the amplified error signal curve, for a large range of the gains and the estimator voltage slopes a response close to time optimal will occur.

Ideally, when a lossless switching converter is controlled, the emulator waveforms are virtually the same as those of the switching converter. However, in reality, due to conduction and switching losses for the same value of the duty ratio of signal δ(t), emulator 313 and power stage 301 produce slightly different voltages. The losses usually cause the DC output voltage of the converter to be smaller than that of the low-pass filter and, consequently, a nonzero error at the input of differential amplifier 306 of FIG. 3. The difference between two voltages is:

$$v_{diff} = V_{est} - V_{out} = AV_{err} \quad (25)$$

wherein A is the gain of the differential amplifier and $V_{err}$ the steady state value of the error signal.

To quantify this error and explain its dependence on the operating conditions, a DC model of non-ideal switching buck converter including switching component losses and a DC model of filter 316 (i.e., ideal DC converter) can be compared. It can be seen that for the same duty ratio delivered to both power stage 301 and filter 316, filter 316 produces an output voltage that is larger by:

$$v_{diff} \approx I_{load} R_{loss} = A(V_{ref} - V_{out}) \quad (26)$$

For example, in a case when the switchers having $R_{on}$ resistance of approximately 100 mΩ are used and the amplifier gain A is 10, at 2.5 A of the output current (78% efficient converter for a 0.9V output) the offset in voltage regulation, due to this error, is about 25 mV.

The previously described regulation error can be utilized to further minimize the size of output capacitor C through voltage droop technique as well as for a rough estimation of the output load current. In the voltage droop techniques, the output voltage is not kept at the constant value for all operating conditions. Instead, at heavier loads the voltage is set to be a little bit lower than the reference allowing for larger overshoots during heavy-to-light load transients. Similarly, for the lighter loads the output voltage is increased, as shown in FIG. 12. It can also be seen that the utilization of the voltage droop technique reduces the peak inductor current, further minimizing the output filter size.

It is noted that by regulating the gain of the differential amplifier (i.e., amplifier 306 and adder 304), inherent voltage droop feature can be achieved. Furthermore, the voltage difference at the output of the differential amplifier can be measured to obtain a rough estimate of the output load value.

Figure 15:
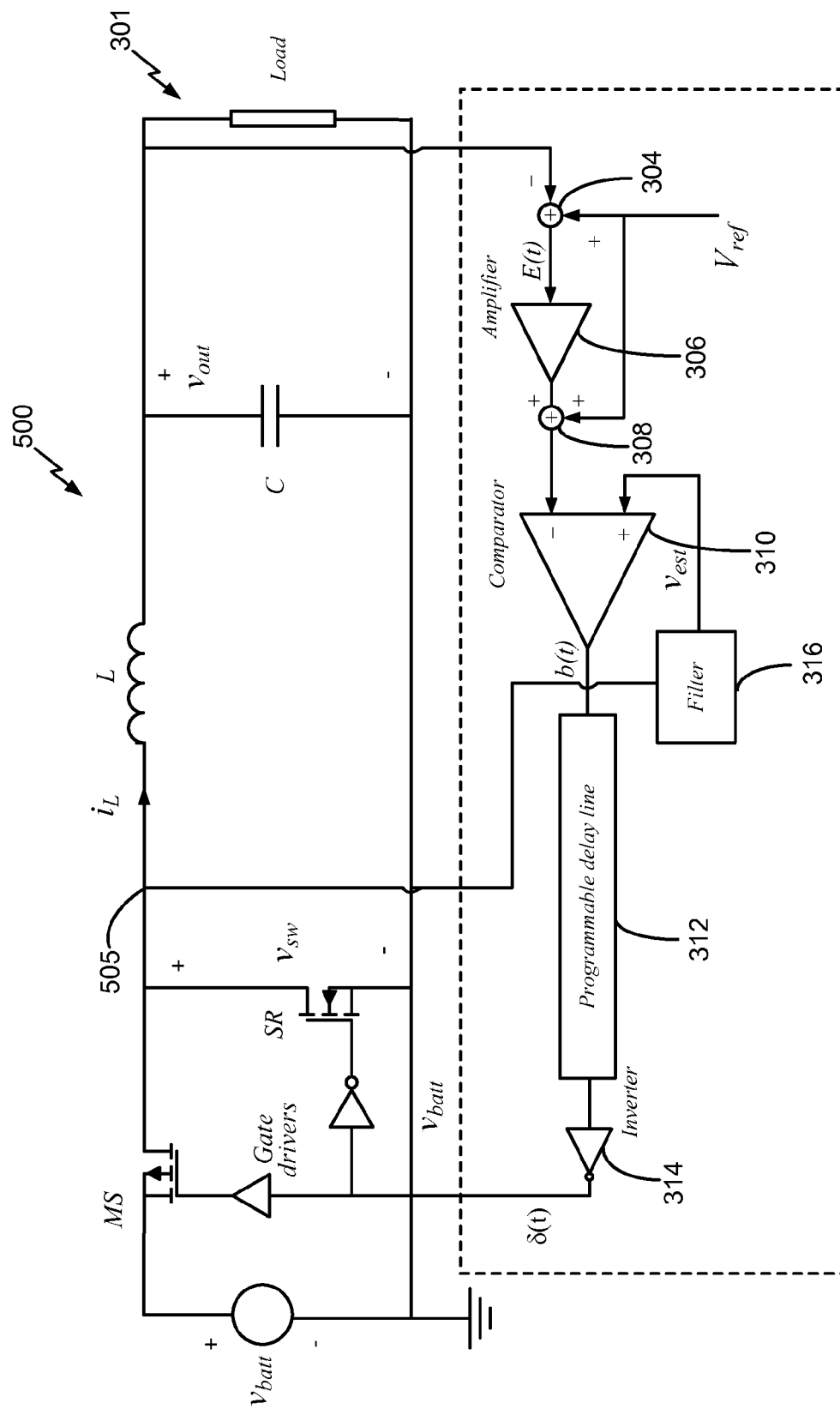
FIG. 15 illustrates another converter coupled to a controller, according to an exemplary embodiment of the present invention.

For the case when the voltage droop is not applicable, device 300 of FIG. 3 can be modified as shown in FIG. 15, to minimize the influence of the semiconductor losses and consequently the steady state error.

With reference to FIG. 15, a device 500 is illustrated including a controller 502 and power stage 301 (e.g., of a buck converter), according to an exemplary embodiment of the present invention. Controller 502 includes an adder 304, an amplifier 306, an adder 308, a comparator 310, a programmable delay line 312, a inverter 314, and a low-pass filter 316.

In contrast to controller 302, filter 316 of controller 502 is directly supplied from a switching node 505. This provides the same voltage at the inputs of the power stage LC filter and filter 316 of the emulator. As a result, the impact of the semiconductor losses on the voltage regulation is eliminated. Now, the only discrepancy between the dc values of $v_{out}(t)$ and $v_{est}(t)$ may occur due to the losses of the power stage filter (i.e., inductor L and capacitor C), which, in general, are significantly smaller than the semiconductor losses, and may be omitted, as in the case of filter-less audio amplifiers. In other words, controller 502 compares the average value of the switching voltage (i.e., $V_{sw}$) with $V_{est}$.

Figure 16:
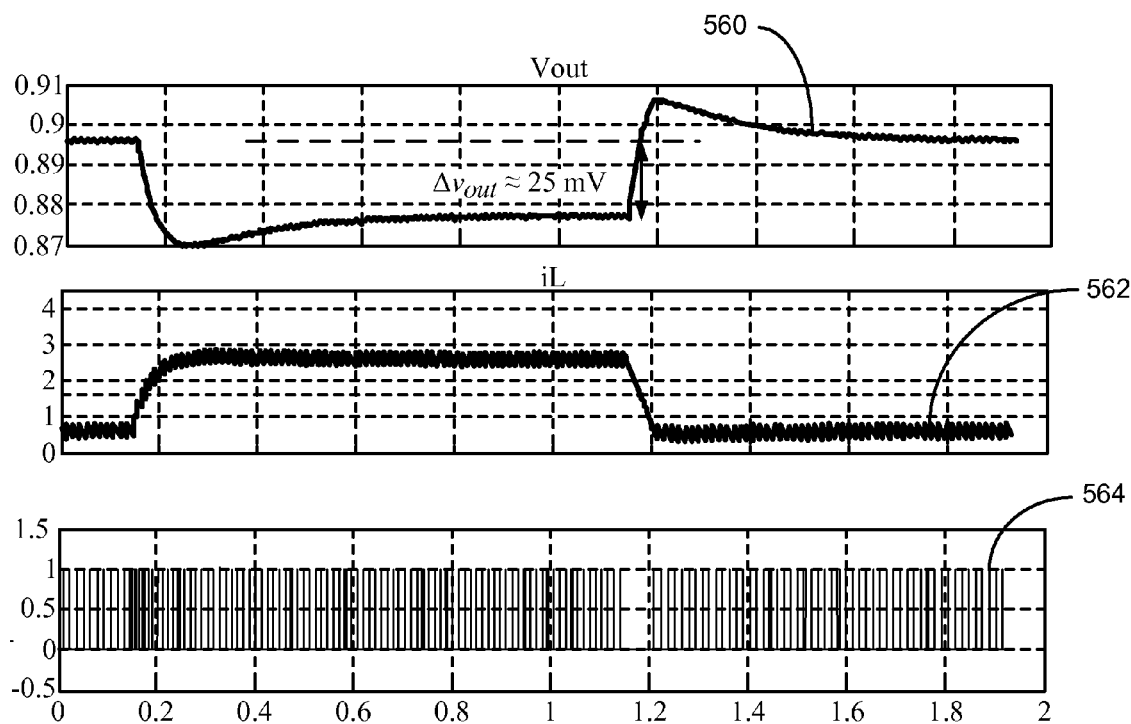
FIGS. 16 and 17 illustrate simulation results of a controller, in accordance with an exemplary embodiment of the present invention.
Figure 17:
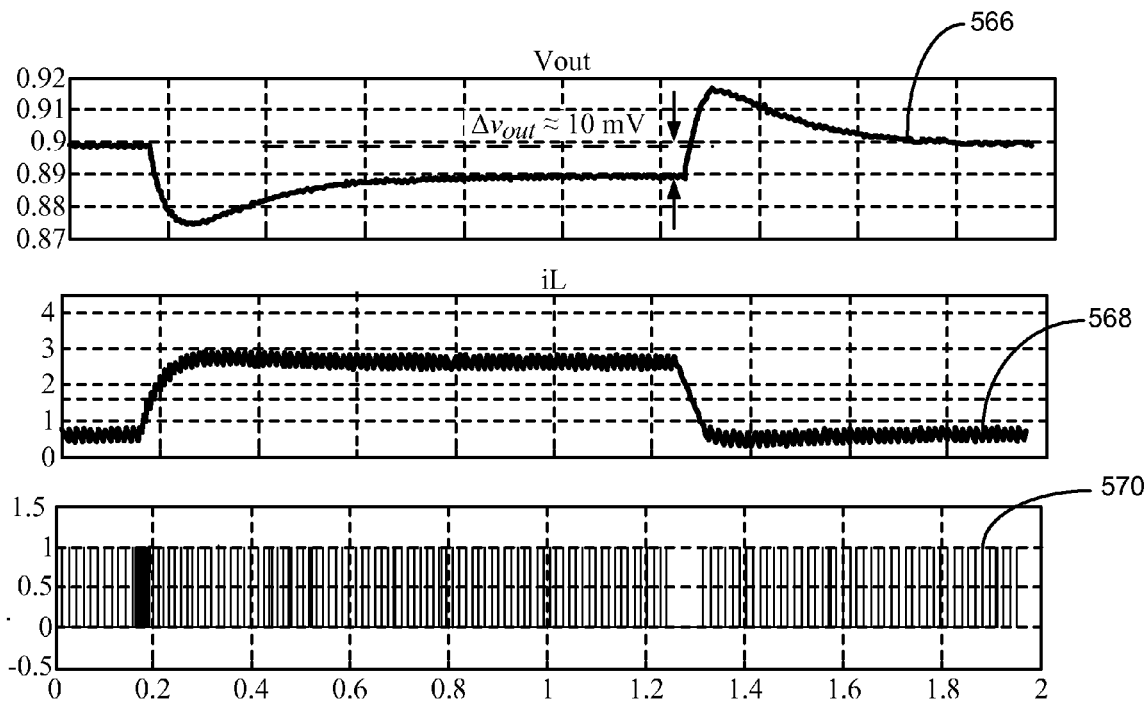

Controller 502 is simulated using a model (not shown) and compared to a model of controller 302. For controller 502, a converter with 60 mΩ of the equivalent semiconductor losses and 40 mΩ filter losses was used. The results of simulations are shown in FIGS. 16 and 17. With reference to FIGS. 3 and 16, a waveform 560 represents output voltage Vout, a waveform 562 represents a current through inductor L, and a waveform 564 represents signal δ(t). With reference to FIGS. 15 and 17, a waveform 566 represents output voltage Vout, a waveform 568 represents a current through inductor L, and a waveform 570 represents signal δ(t). It is noted that the proposed modification (i.e., controller 502) reduces voltage error in comparison to controller 302 and, thus regulation is significantly improved.

The presented controller architecture allows a simple implementation of a feature for the reduction of electromagnetic interface (EMI) caused by the operation of the converter at a fixed frequency. In the previous analysis it was shown that the switching frequency of the buck converter is:

$$f_{sw} = \frac{V_{ref} \cdot (V_{bat} - V_{ref})}{T_d \cdot V_{bat}^2} \quad (27)$$

where, for device 300 of FIG. 3, $V_{batt}$ is supply voltage, $V_{ref}$ the output voltage reference, and $\tau_d$ propagation time of the delay line. This equation indicates that the switching frequency of the converter can be regulated by varying the propagation time of the delay line in accordance with a predefined pattern. More importantly, in this system, the duty ratio of the buck converter does not depend on the propagation time of the delay line and, consequently, any change of the propagation time that is at the rate slower or equal to the switching rate does not require any correcting action that would be used for maintaining voltage regulation, significantly simplifying implementation of noise reduction techniques. With reference to FIG. 11, since all the current waveforms are linear, any increase in $T_d$ causes a proportional increase of $T_+$ and $T_-$ intervals and, consequently, of the transistor on-time as well as of the overall switching period of the converter.

Figure 18A:
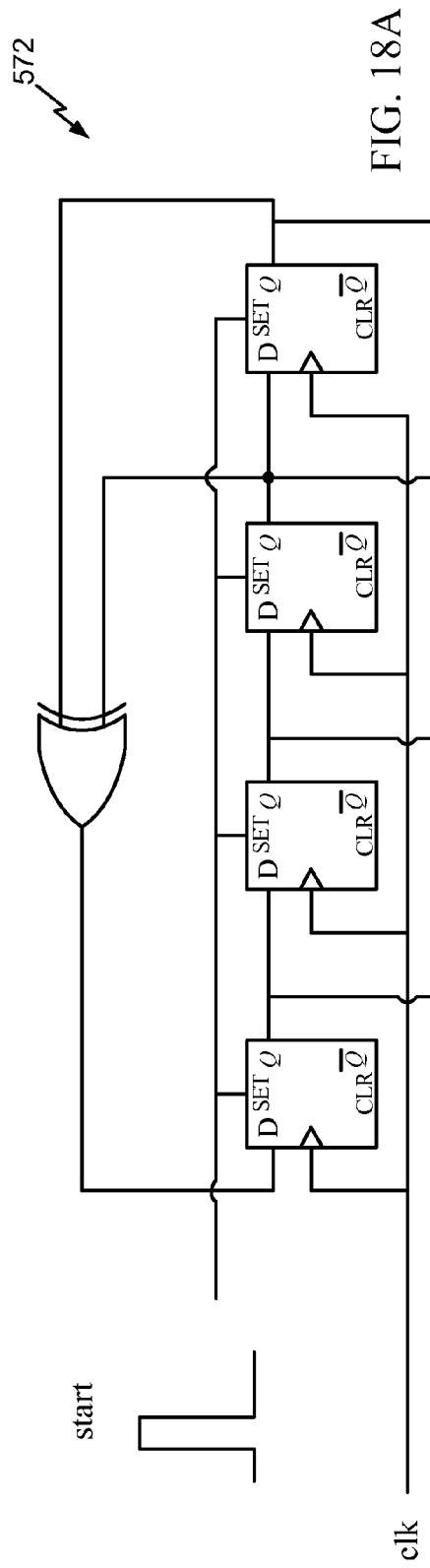
FIG. 18A illustrates a pseudo-random data generator base on a 4-bit shift register.
Figure 18B:
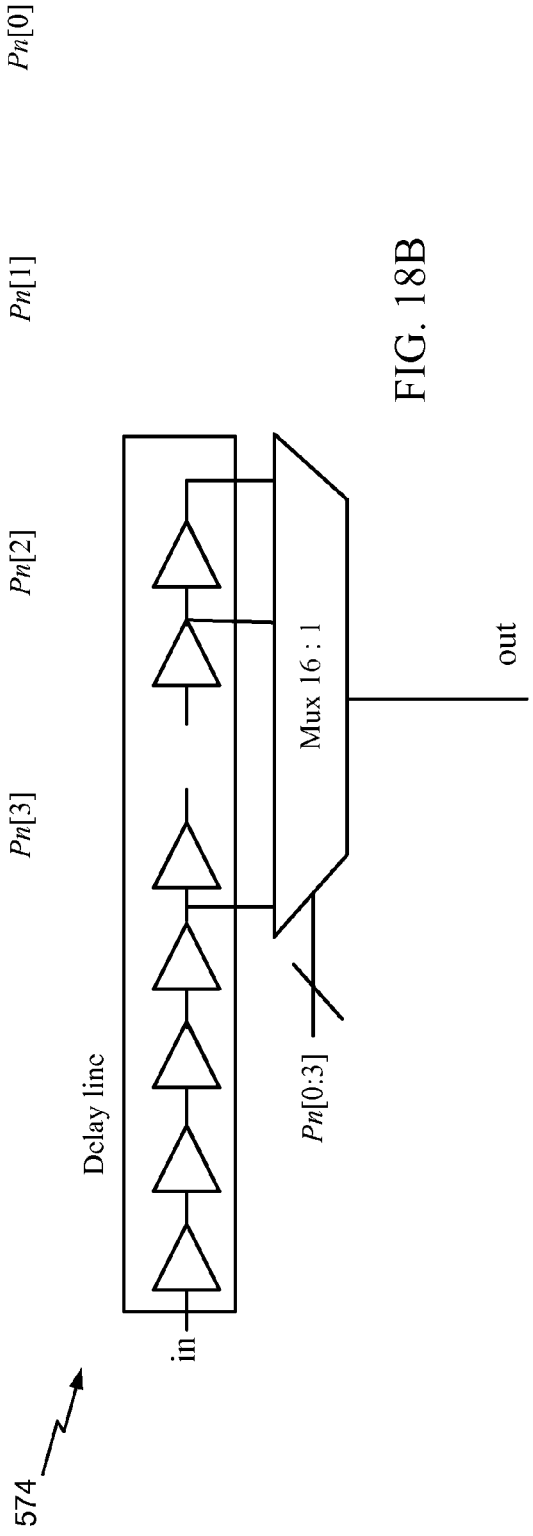
FIG. 18B illustrates a delay line.

Implementation of the EMI reduction technique, according to an exemplary embodiment, will now be described. To create spread spectrum around the switching frequency a pseudo-random data generator, such as pseudo-random data generator 572 illustrated in FIG. 18A, is utilized and, accordingly, the original delay line is modified as shown in delay line 574 of FIG. 18B. As will be appreciated by a person having ordinary skill in the art, data generator 572 creates a pseudo-random sequence of numbers that is used to dynamically change the length (i.e., propagation time of delay line 574) in each switching cycle. A model (not shown) of data generator 572 was used to verify operation of the EMI reduction system. Simulation results of the model of a data generator used to verify operation of the EMI reduction system are shown in FIGS. 19A-22B. It should be noted that other techniques besides pseudo-random number generation may be used for changing the time delay (i.e., frequency) and obtaining EMI reduction. For example, sigma-delta modulation and other well-known techniques may be used.

Figure 19A:
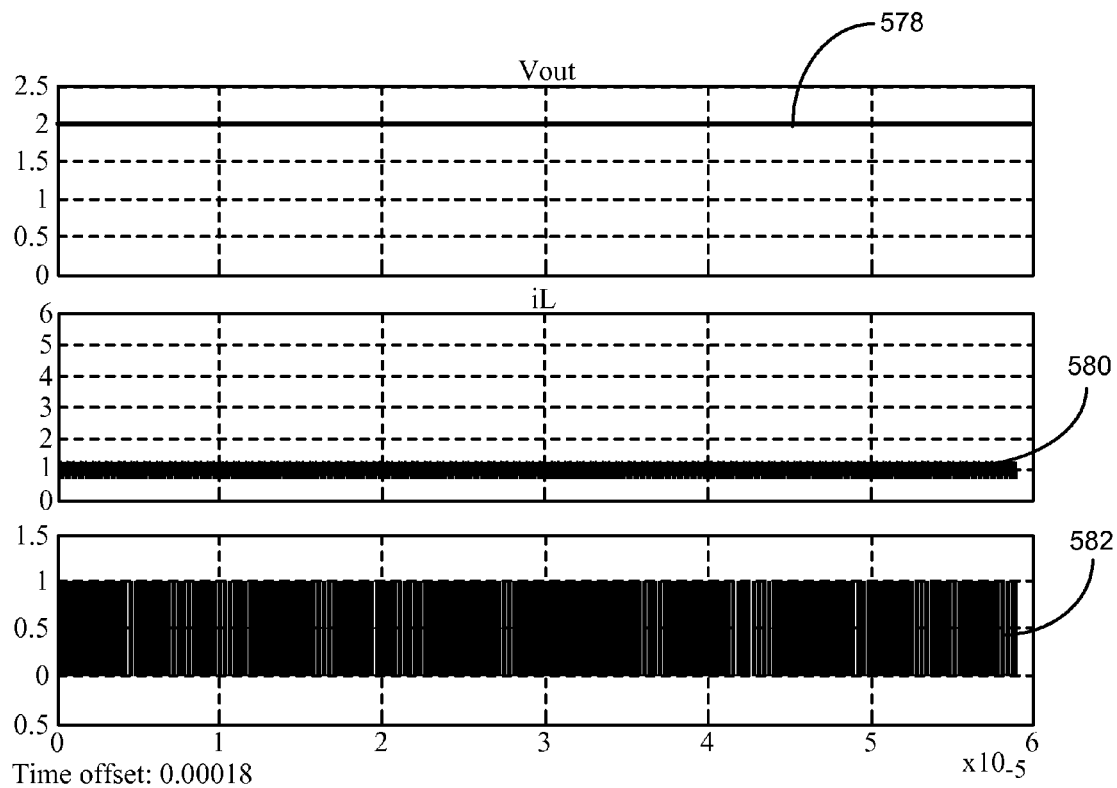
FIG. 19A illustrates waveforms associated with a conventional converter in steady-state.
Figure 19B:
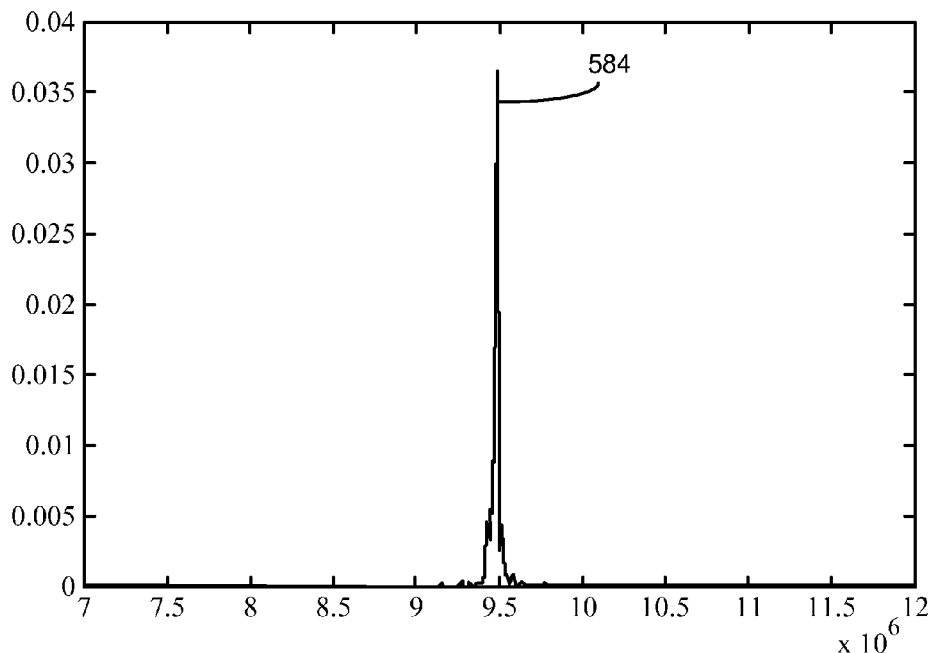
FIG. 19B is a plot depicting a spectrum of an input current of the conventional converter.
Figure 20A:
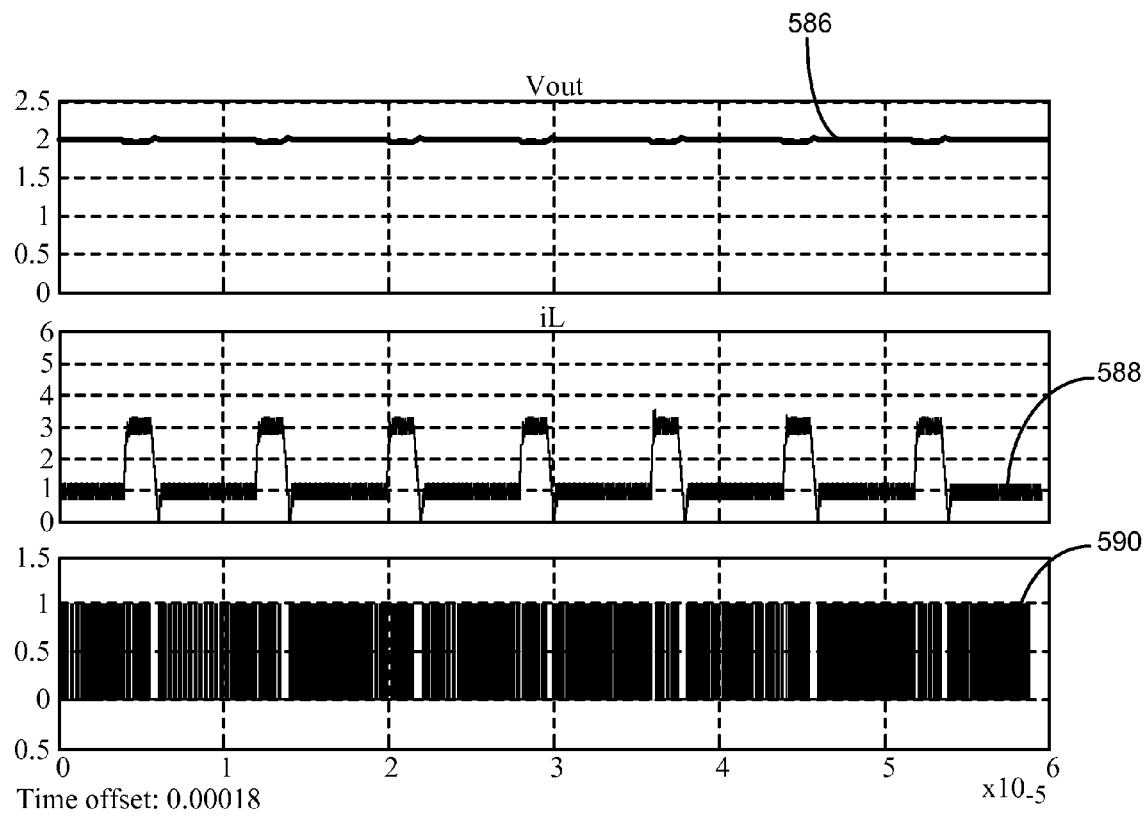
FIG. 20A illustrates waveforms associated with a conventional converter under a repetitive load transient.
Figure 20B:
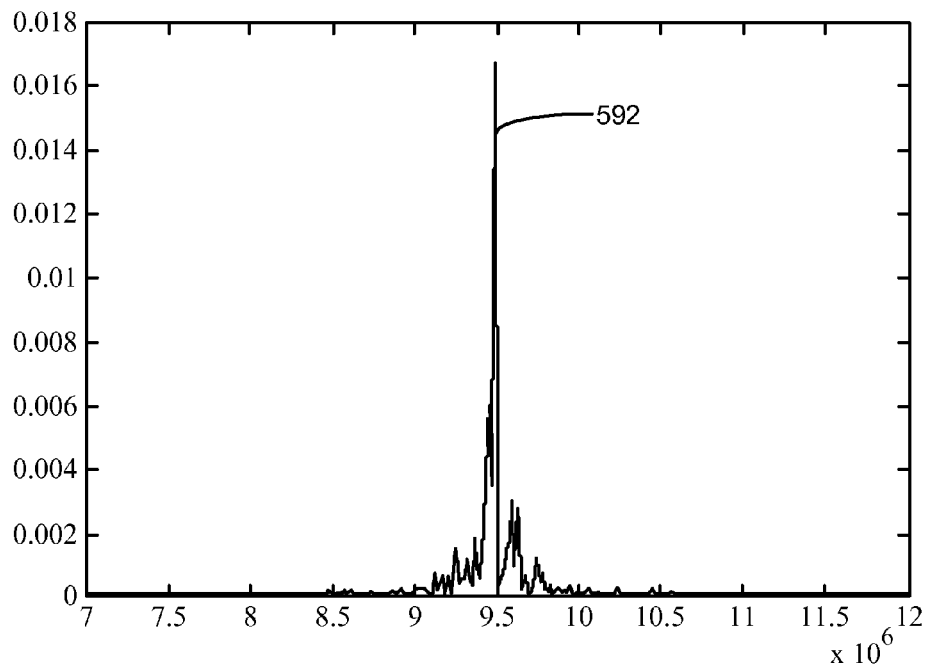
FIG. 20B is a plot depicting a spectrum of an input current of the conventional converter.
Figure 21A:
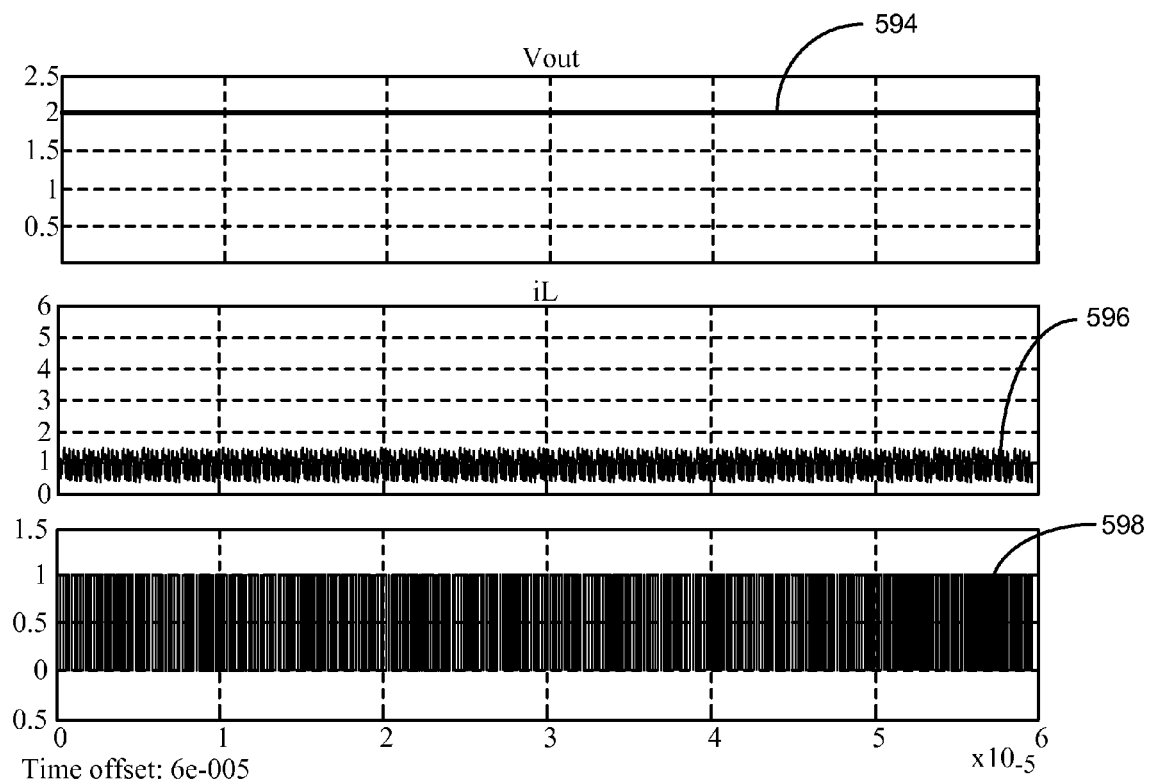
FIG. 21A illustrates waveforms associated with a controller, according to an exemplary embodiment of the present invention.
Figure 21B:
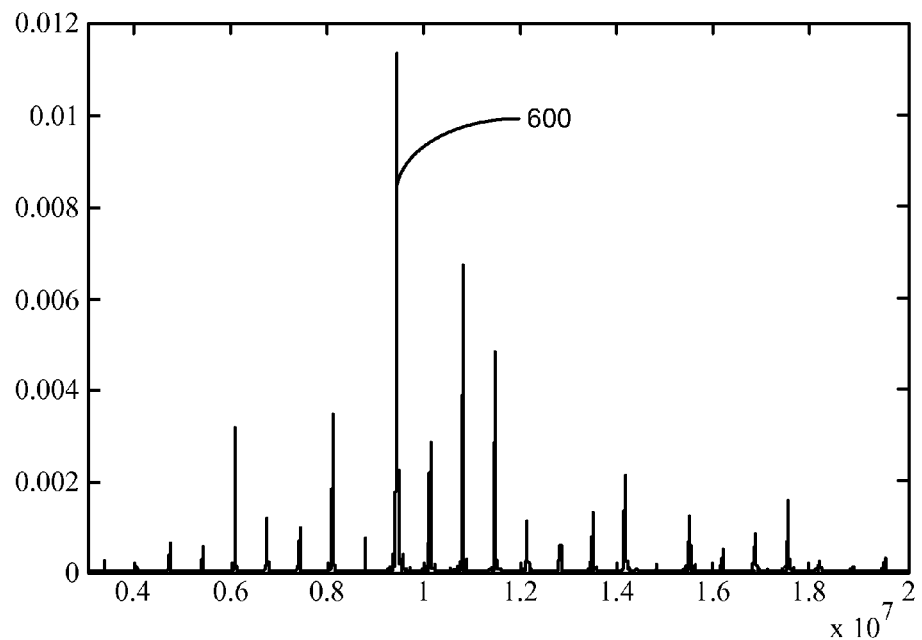
FIG. 21B is a plot depicting a spectrum of the input current of a controller, in accordance with an exemplary embodiment of the present invention.
Figure 22A:
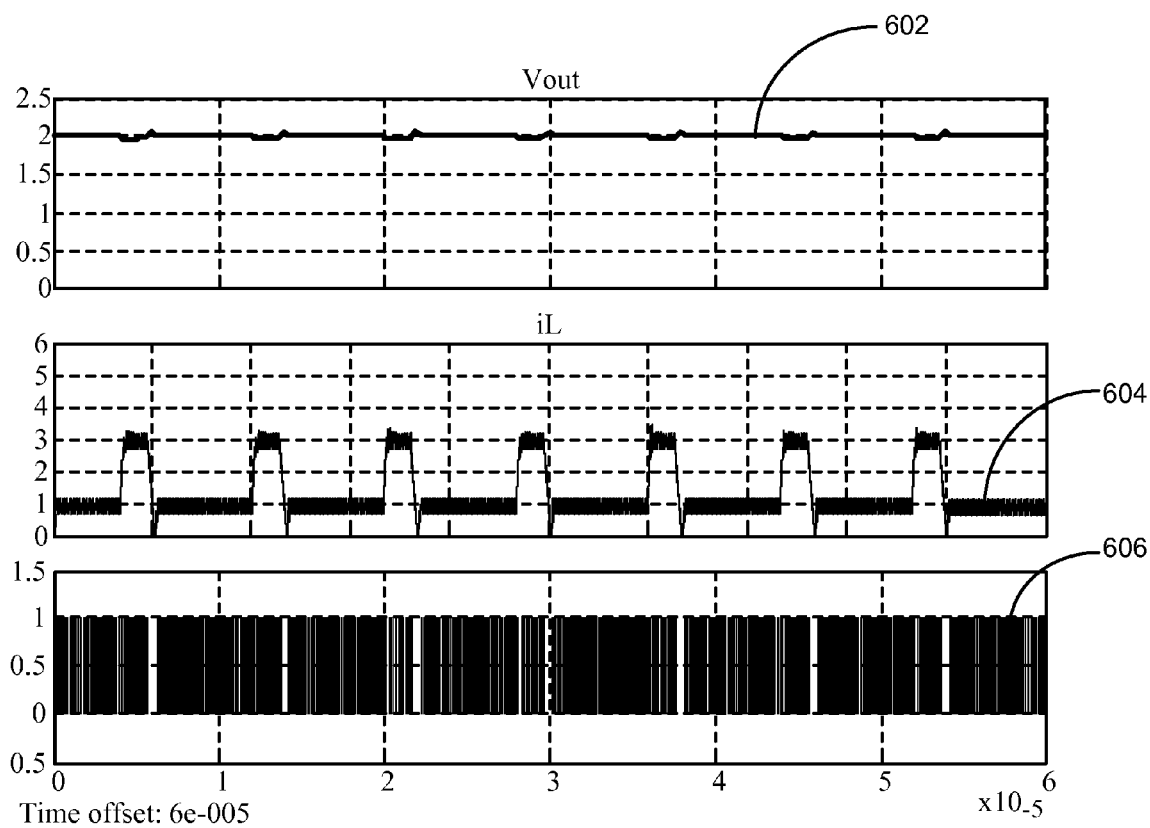
FIG. 22A illustrates additional waveforms associated with a controller, according to an exemplary embodiment of the present invention.
Figure 22B:
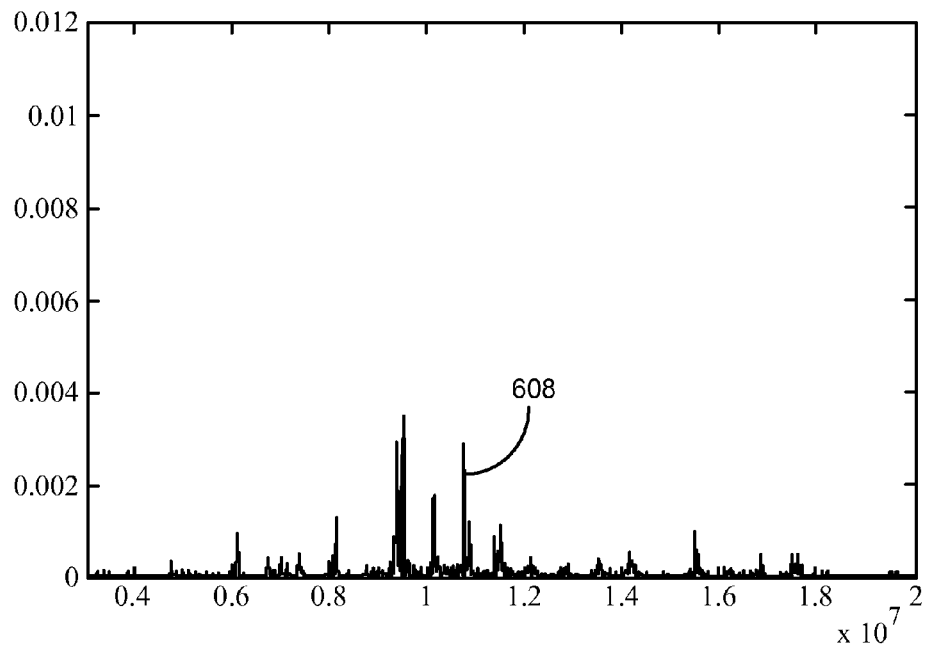
FIG. 22B is a plot depicting a spectrum of the input current of a controller, in accordance with an exemplary embodiment of the present invention.

FIGS. 19A and 19B illustrate operation of a conventional controller in steady-state. With reference to FIG. 19A, waveform 578 represents output voltage Vout, waveform 580 represents a current through inductor L, and waveform 582 represents a switching frequency. With reference to FIG. 19B, a waveform 584 represents a spectrum of an input current. FIGS. 20A and 20B illustrate operation of a conventional controller under a repetitive load transient wherein a load transient frequency is equal to 125 kHz. With reference to FIG. 20A, waveform 586 represents output voltage Vout, waveform 588 represents a current through inductor L, and waveform 590 represents a switching frequency. With reference to FIG. 20B, a waveform 592 represents a spectrum of an input current. FIGS. 21A and 21B illustrate operation of a controller, according to an exemplary embodiment of the present invention, with a spread spectrum generator in steady-state. With reference to FIG. 21A, waveform 594 represents output voltage Vout, waveform 596 represents a current through inductor L, and waveform 598 represents a switching frequency. With reference to FIG. 21B, a waveform 600 represents a spectrum of an input current. FIGS. 22A and 22B illustrate operation of a controller, according to an exemplary embodiment of the present invention, with a spread spectrum generator with a repetitive load of 125 kHz. With reference to FIG. 22A, waveform 602 represents output voltage Vout, waveform 604 represents a current through inductor L, and waveform 606 represents a switching frequency. With reference to FIG. 22B, a waveform 608 represents a spectrum of an input current.

It is noted that the waveforms depicted in FIGS. 19A-22B demonstrate that pseudo-random data generator 572 may significantly reduce large spectrum components. It can also be seen that under a variable load the spectrum of the signal is also affected, due to the fast controller action.

To verify operation of controllers 302 and 502 and analyze practical implementation issues, an experimental prototype using discrete components was built, based on controller 302 of FIG. 3 and controller 502 of FIG. 15. In addition, the controllers and power stage (without inductors and capacitors) are also designed in 0.13 μm process. As described in the following subsections, the discrete implementation has proven feasibility of the system. At the same time, it has shown that the discrete implementation significantly limits the switching frequency and/or affects the transient performance of the system.

Figure 23:
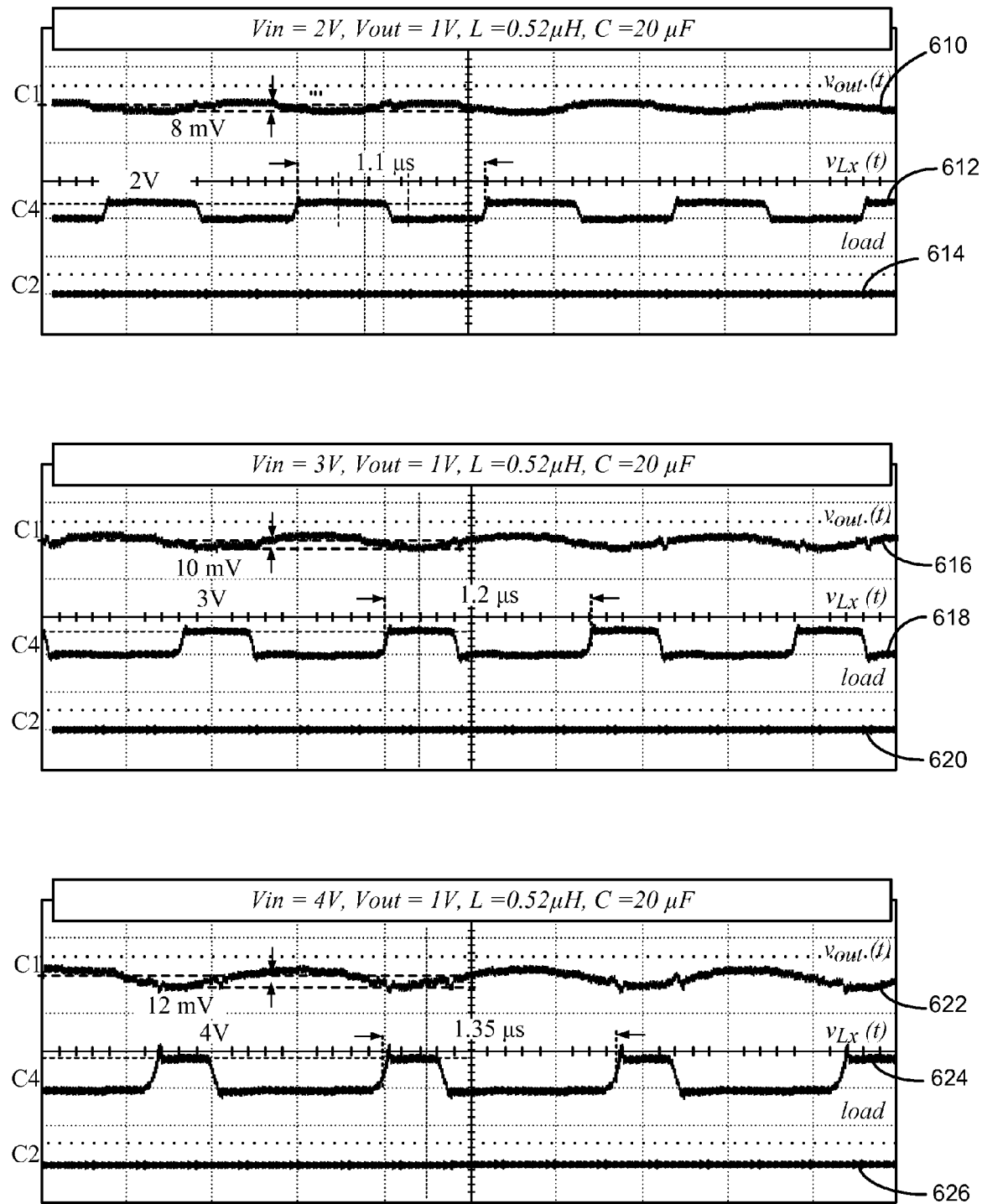
FIGS. 23-27 illustrate waveforms associated with a controller, according to an exemplary embodiment of the present invention.
Figure 24:
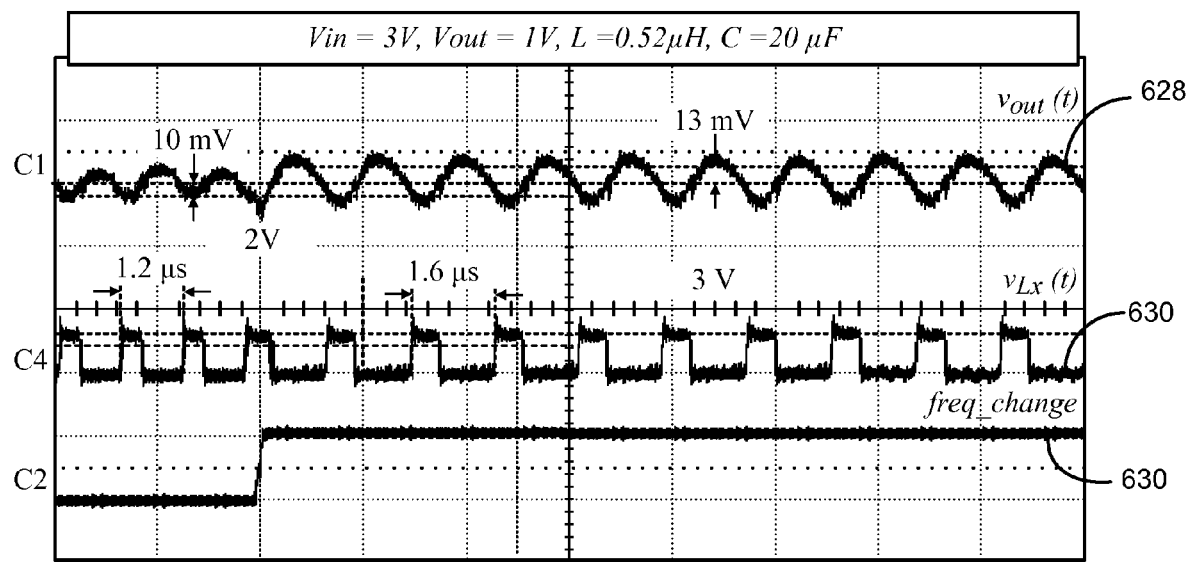

Experimental results confirming stable steady-state operation of devices 300 and 500 are shown in FIGS. 23 and 24. Operation for three different input voltages is shown in FIG. 23. With reference to FIG. 23, signals 610, 612, and 614 respectively represent output voltage Vout, switching node voltage $V_{sw}$, and a load step signal for an input voltage of 2V. Furthermore, signals 616, 618, and 620 respectively represent output voltage Vout, switching node voltage $V_{sw}$, and a load step signal for an input voltage of 3V. Moreover, signals 622, 624, and 626 respectively represent output voltage Vout, switching node voltage $V_{sw}$, and a load step signal for an input voltage of 4V. The results are presented for the minimum delay case and confirm the validity of describing relation between the switching frequency, propagation time of the delay elements, and the steady-state operating conditions.

FIG. 24 shows operation of the system as the propagation time of the delay cells changes "on-line". With reference to FIG. 24, signals 628, 630, and 632 respectively represent output voltage Vout, switching node voltage $V_{sw}$, and a frequency change signal. It can be seen that the system is able to instantaneously change the switching frequency allowing implementation of the EMI mitigation method based on frequency variation, which was described above.

Figure 25:
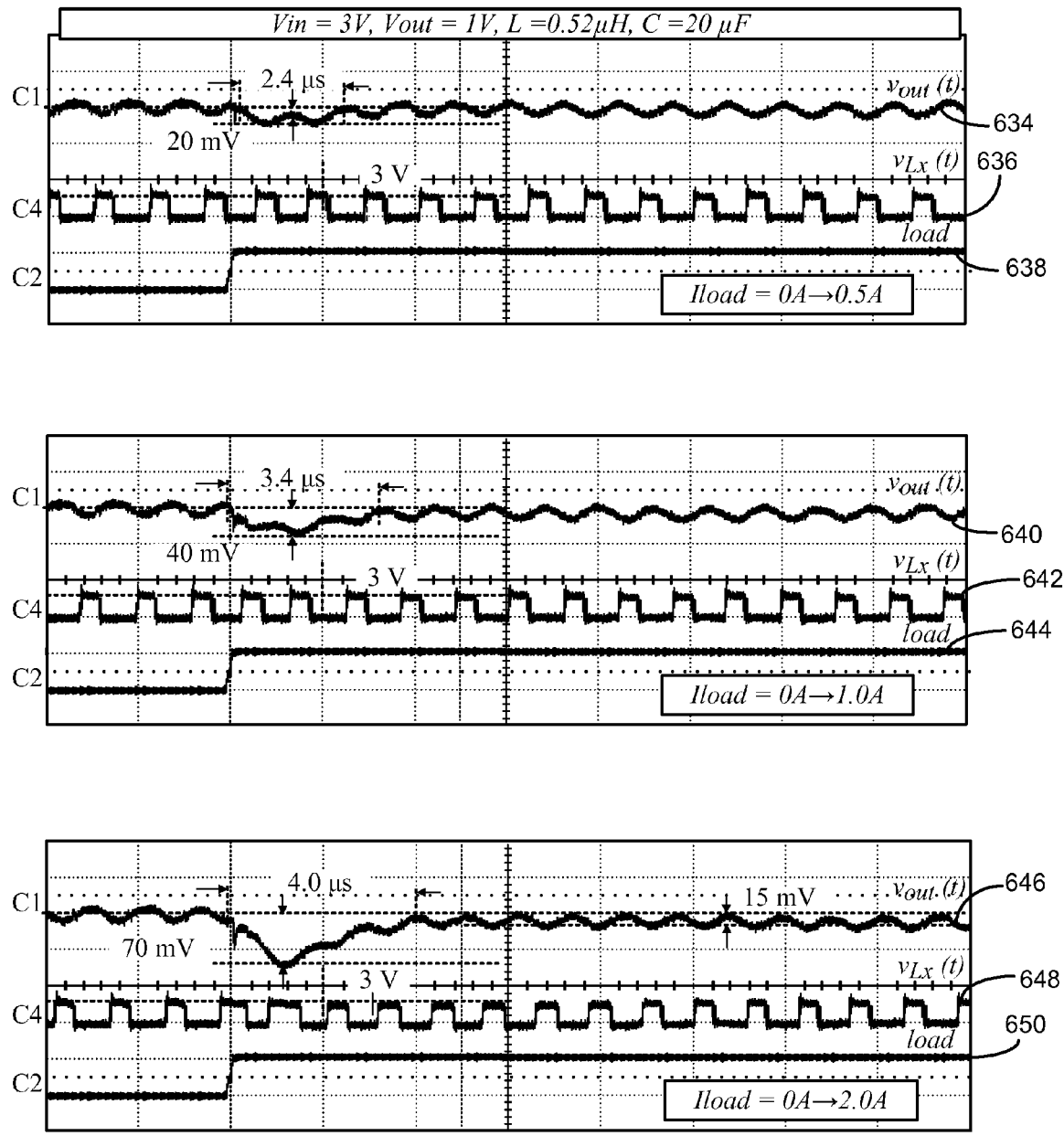
Figure 26:
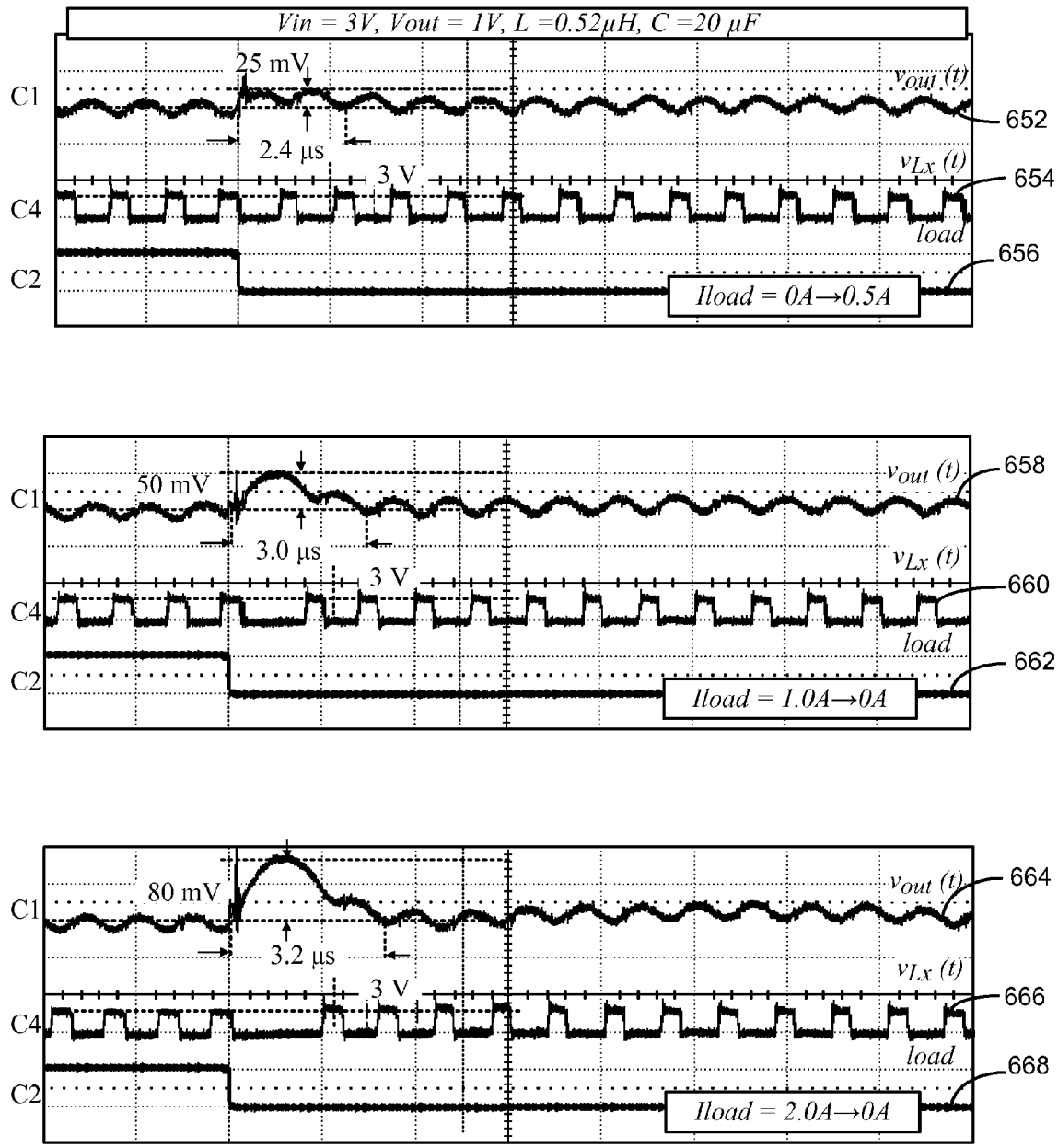

Dynamic response tests of the experimental prototype, which is based on devices 300 and 500, operating at the maximum switching frequency (i.e. minimum propagation time) are shown in FIGS. 25 and 26. With reference to FIG. 25, signals 634, 636, and 638 respectively represent output voltage Vout, switching node voltage $V_{sw}$, and a load step signal for a load current variation of 0.0A to 0.5A. Furthermore, signals 640, 642, and 644 respectively represent output voltage Vout, switching node voltage $V_{sw}$, and a load step signal for a load current variation of 0.0A to 1.0A. Moreover, signals 646, 648, and 650 respectively represent output voltage Vout, switching node voltage $V_{sw}$, and a load step signal a load current variation of 0.0A to 2.0A. With reference to FIG. 26, signals 652, 654, and 656 respectively represent output voltage Vout, switching node voltage $V_{sw}$, and a load step signal for a load current variation of 0.5A to 0.0A. Furthermore, signals 658, 660, and 662 respectively represent output voltage Vout, switching node voltage $V_{sw}$, and a load step signal for a load current variation of 1.0A to 0.0A. Moreover, signals 664, 666, and 668 respectively represent output voltage Vout, switching node voltage $V_{sw}$, and a load step signal a load current variation of 2.0A to 0.0A. The response is tested over a wide range of input voltage values as well as for different load transients. It can be noticed that for 0 to 0.5 A and 0.5 A to 1 A the system recovers in a less than two switching cycles, even though, the reaction of the controller is barely noticeable on the diagrams. These waveforms actually confirm a very accurate controller operation that does not introduce current or overstress. This can be explained by calculating ideal $t_{on}$ time needed for the controller to increase the current by a given load step value:

$$t_{on} = \frac{L\Delta i}{(V_{bat} - V_{ref})} \quad (28)$$

For the given operating conditions, in the experimental circuit, the needed time $t_{on}$ varies between 60 ns (for 5 V input and 0.5A current step) to 170 ns (for 3 V input and 1 A current step), which, in all cases, correspond to a minor increase of the duty ratio value.

Figure 27:
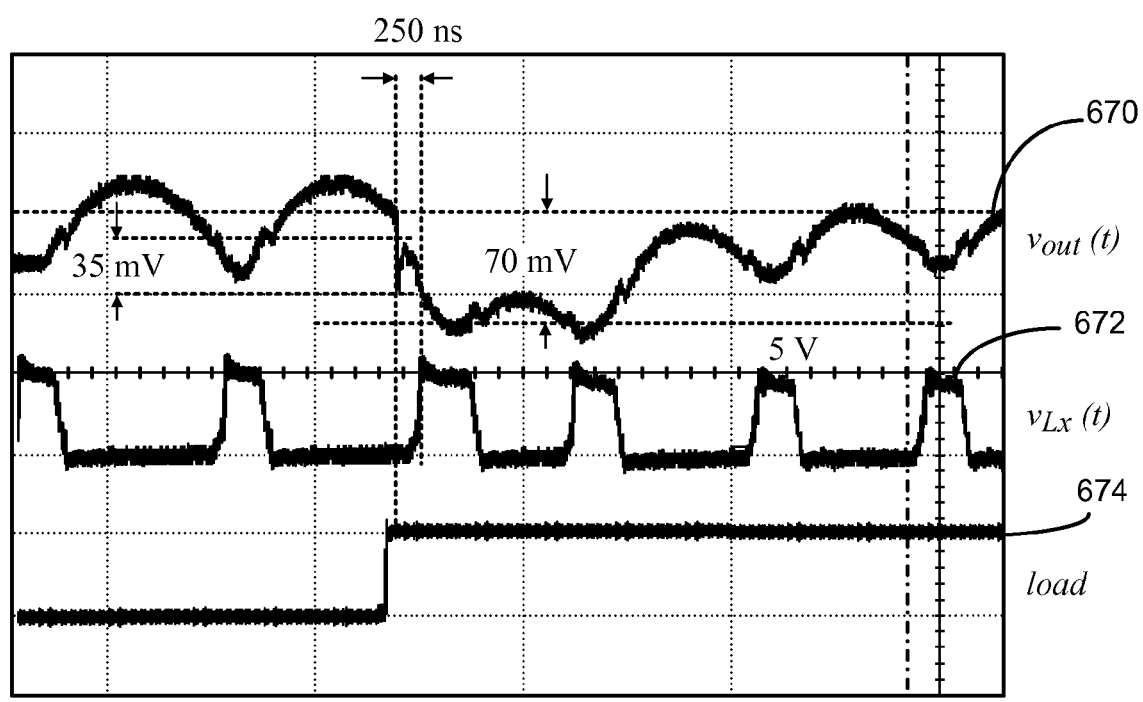

For large heavy-to-light load transients a significant difference between the simulated and actual response exists causing a large than expected voltage deviation. This difference can be explained by looking at FIG. 27 showing zoomed version of the output voltage waveform during a transient. With reference to FIG. 27, signals 670, 672, and 674 respectively represent output voltage Vout, switching node voltage $V_{sw}$, and a load step signal for an input voltage of 5V and an output voltage of 1V. It can be seen that the reaction of the controller to the output voltage deviation is delayed by about 250 ns. This time corresponds to the total contribution of the component delays (the gate driver (~90 ns), FPGA (~80ns), op-amp (~20 ns), the comparator (~10 ns), plus parasitic delays of the PCB).

It can be seen that, due to the delays, the output voltage drops by more than 35 mV before the controller is able to react. The delayed detection is followed by the controller reaction (e.g., about 300 ns increase in the ratio value corresponding to the 2 A current increase for the given operating condition), which in a no-delay case would correspond to the proximity time optimal response. The initial reaction of the controller, resulting in equal inductor and load currents, is followed by a 250 ns $t_{off}$ time that, as depicted in FIG. 11, is again caused by the delay line. The previously described delays may be due to the discrete implementation of the experimental setup.

Figure 28:
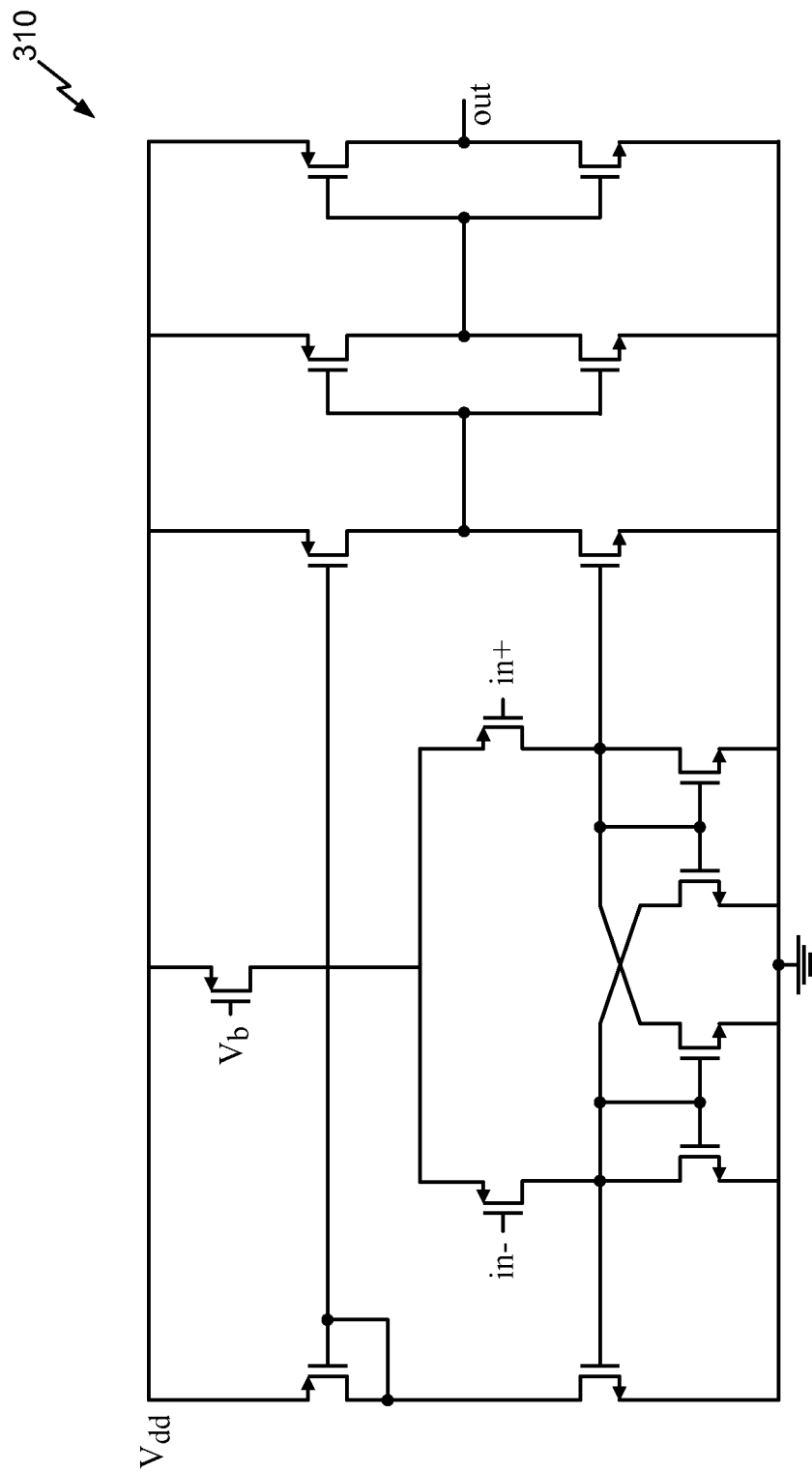
FIG. 28 illustrates a circuit diagram of a comparator.

To test performance of a potential on-chip controller implementation, and show that the delays may be reduced, simulations were performed based on a cadence setup. All the system components except the operational amplifier are designed using IBM 0.13 µm process. Those include power stage and gate drivers, programmable current-starved delay cells, and the rail-to-rail buffer/inverter and comparator 310 of FIG. 28. In the simulations the operational amplifier is an abstract Verilog A block. The switching frequency of the designed system is 2.5 MHz. For the emulator's LP filter the following values of the components are used C=200 pF and $R_f$=4 KΩ.

Figure 29:
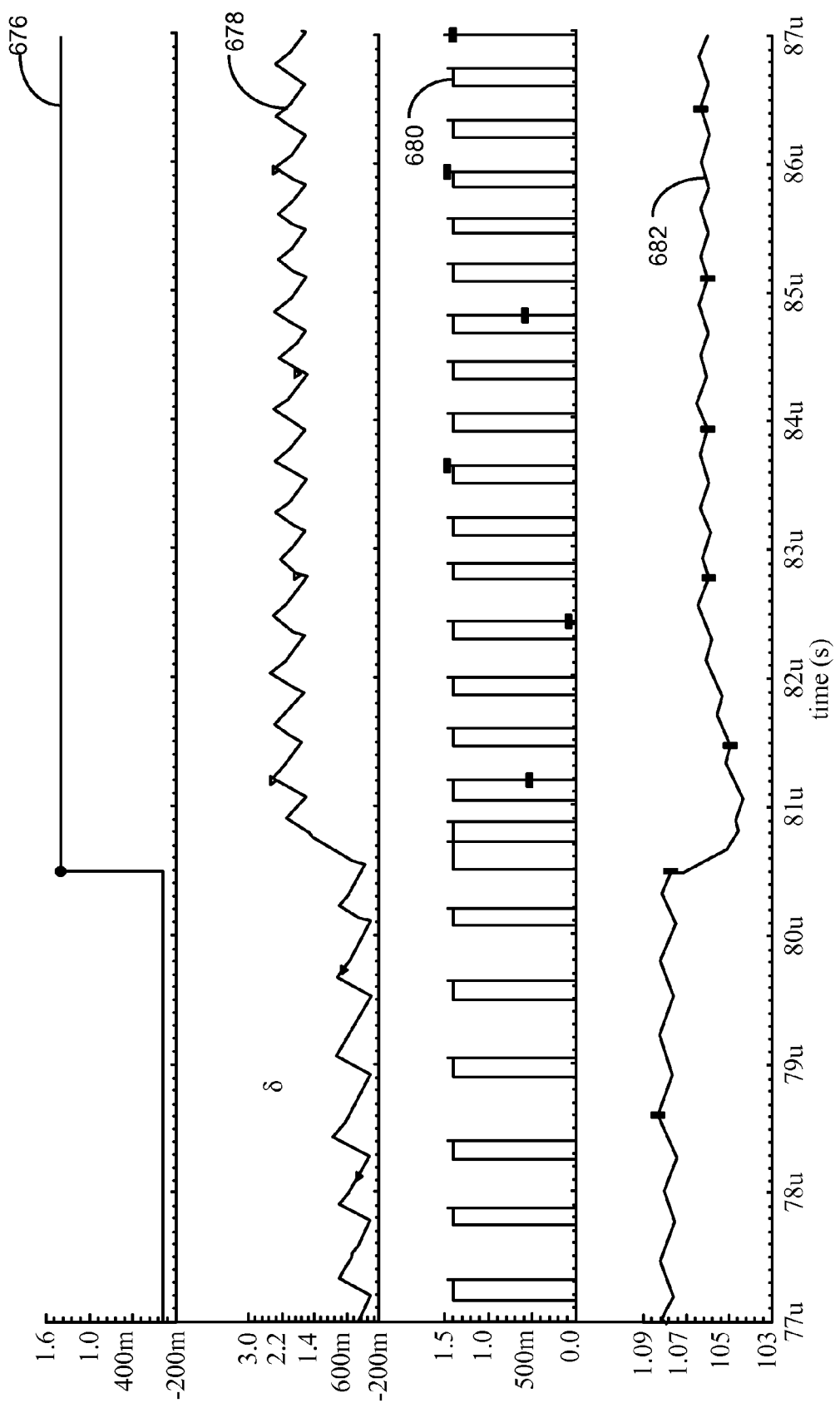
FIGS. 29 and 30 illustrate additional waveforms associated with a controller, according to an exemplary embodiment of the present invention.
Figure 30:
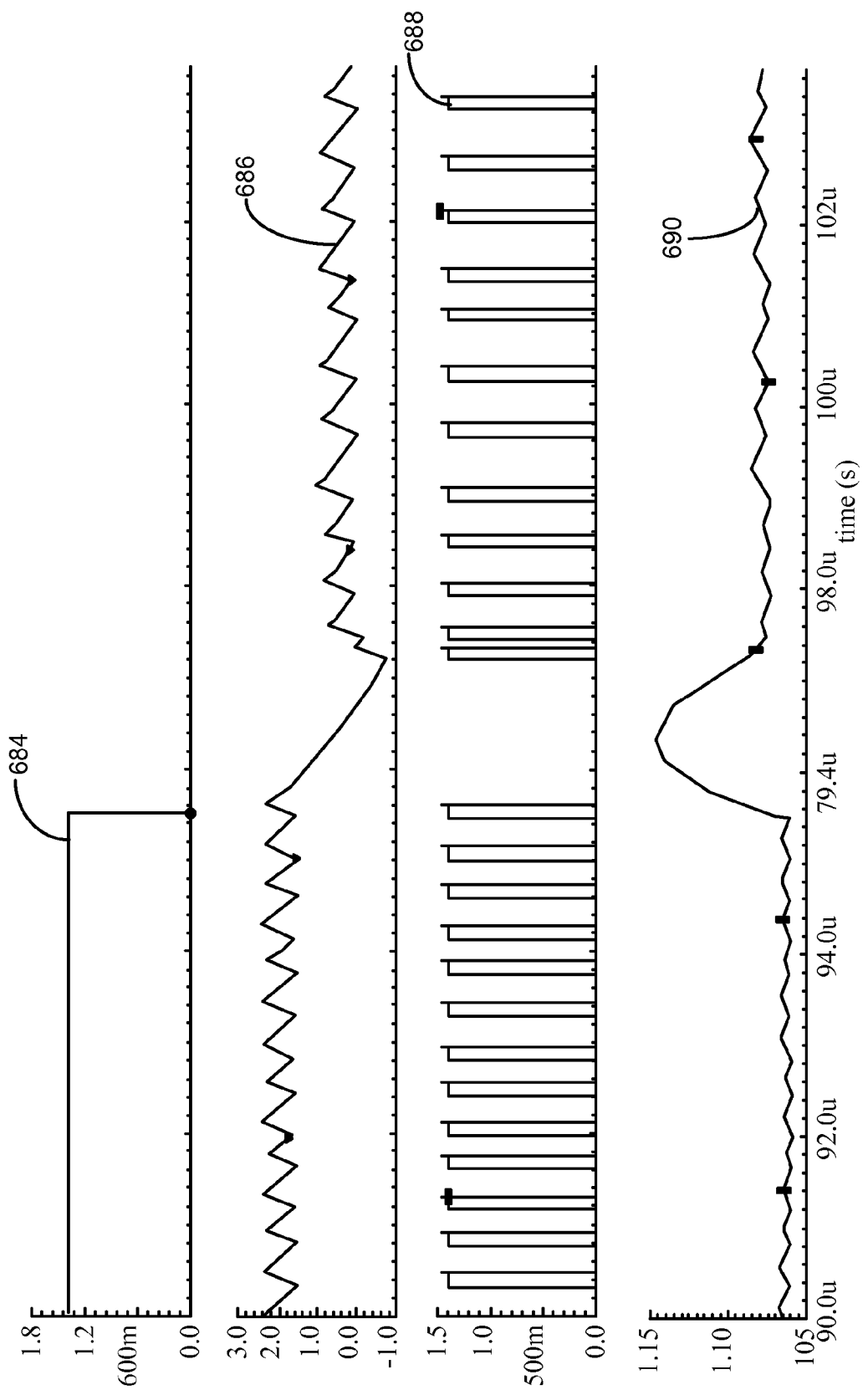
Figure 34:
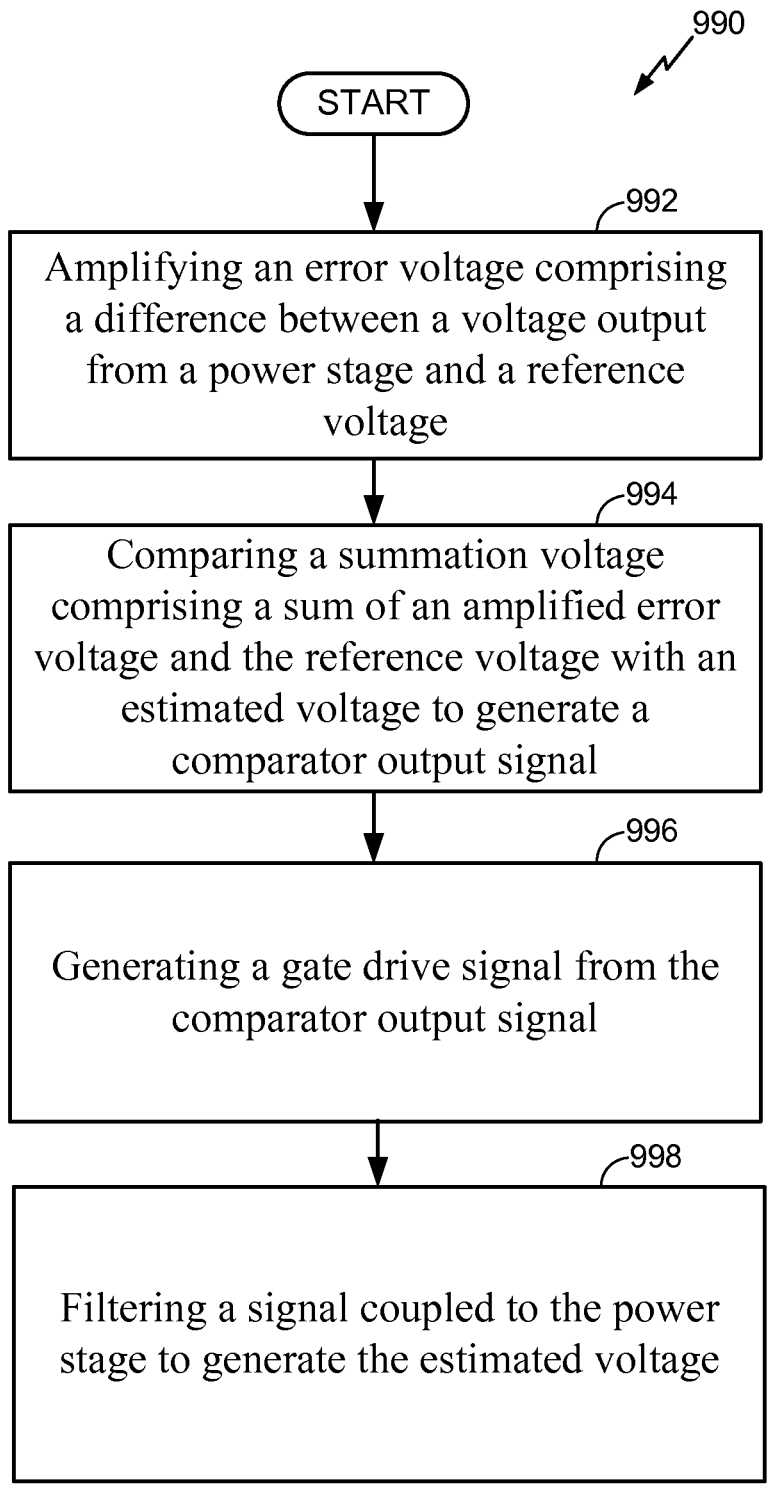
FIG. 34 is a flowchart illustrating another method, in accordance with an exemplary embodiment of the present invention.

FIGS. 29 and 30 demonstrate dynamic characteristics of device 300 depicted in FIG. 3 (i.e., the controller in which the signal for the low-pass filter is provided by a rail-to-rail inverter). FIG. 29 illustrates a light-to-heavy load transient response and FIG. 34 illustrates a heavy-to-light transient response. With reference to FIG. 29, signals 676, 678, 680, and 682 respectively represent a load step current, a current through inductor L, signal δ(t), and output voltage Vout. With reference to FIG. 30, signals 684, 686, 688, and 690 respectively represent a load step current, a current through inductor L, signal δ(t), and output voltage Vout. In this case, to speed up the system performance the delay line is temporarily bypassed upon the initial transient is detected.

Figure 31:
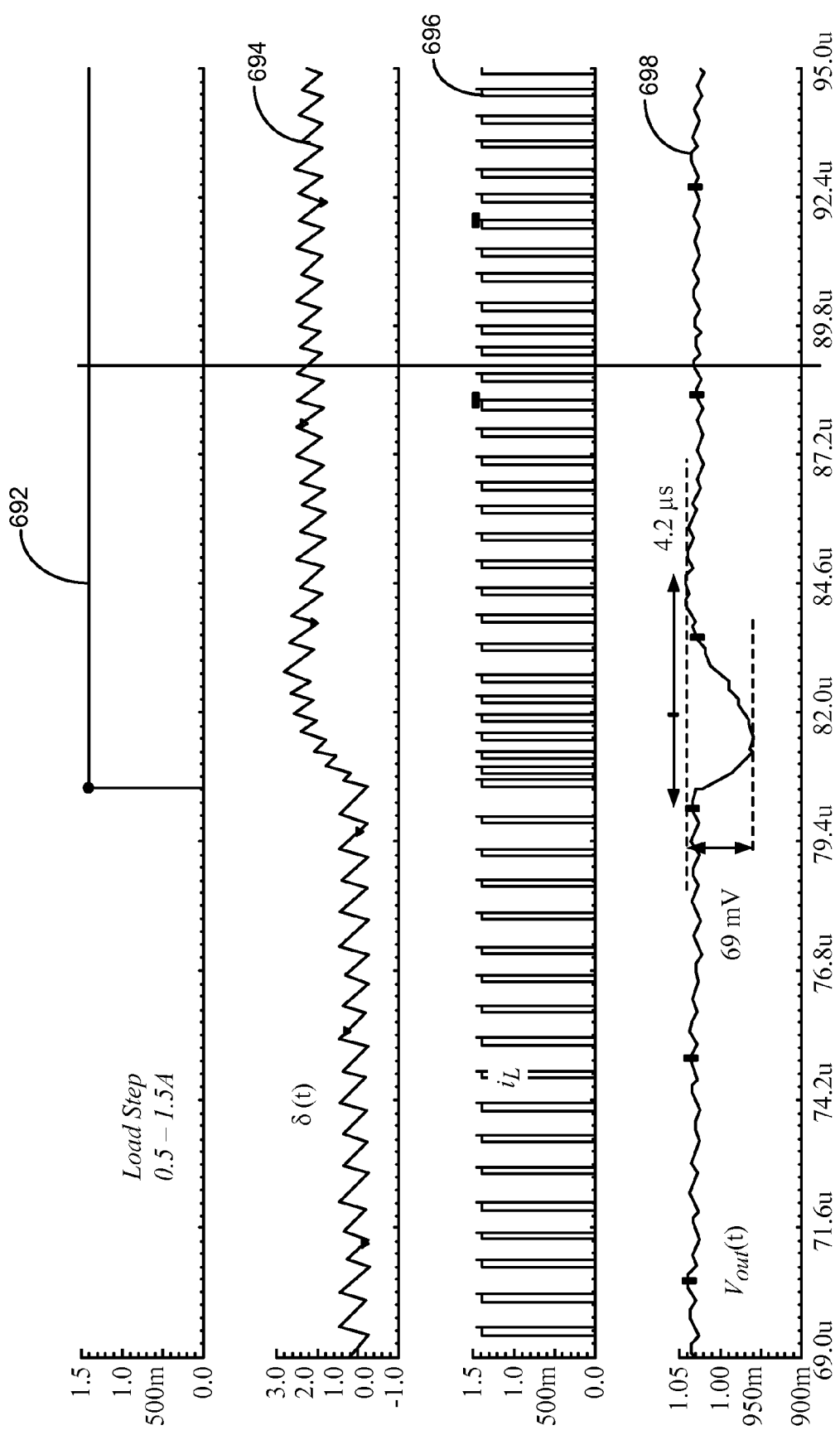
FIGS. 31 and 32 illustrate additional waveforms associated with a controller, according to an exemplary embodiment of the present invention.
Figure 32:
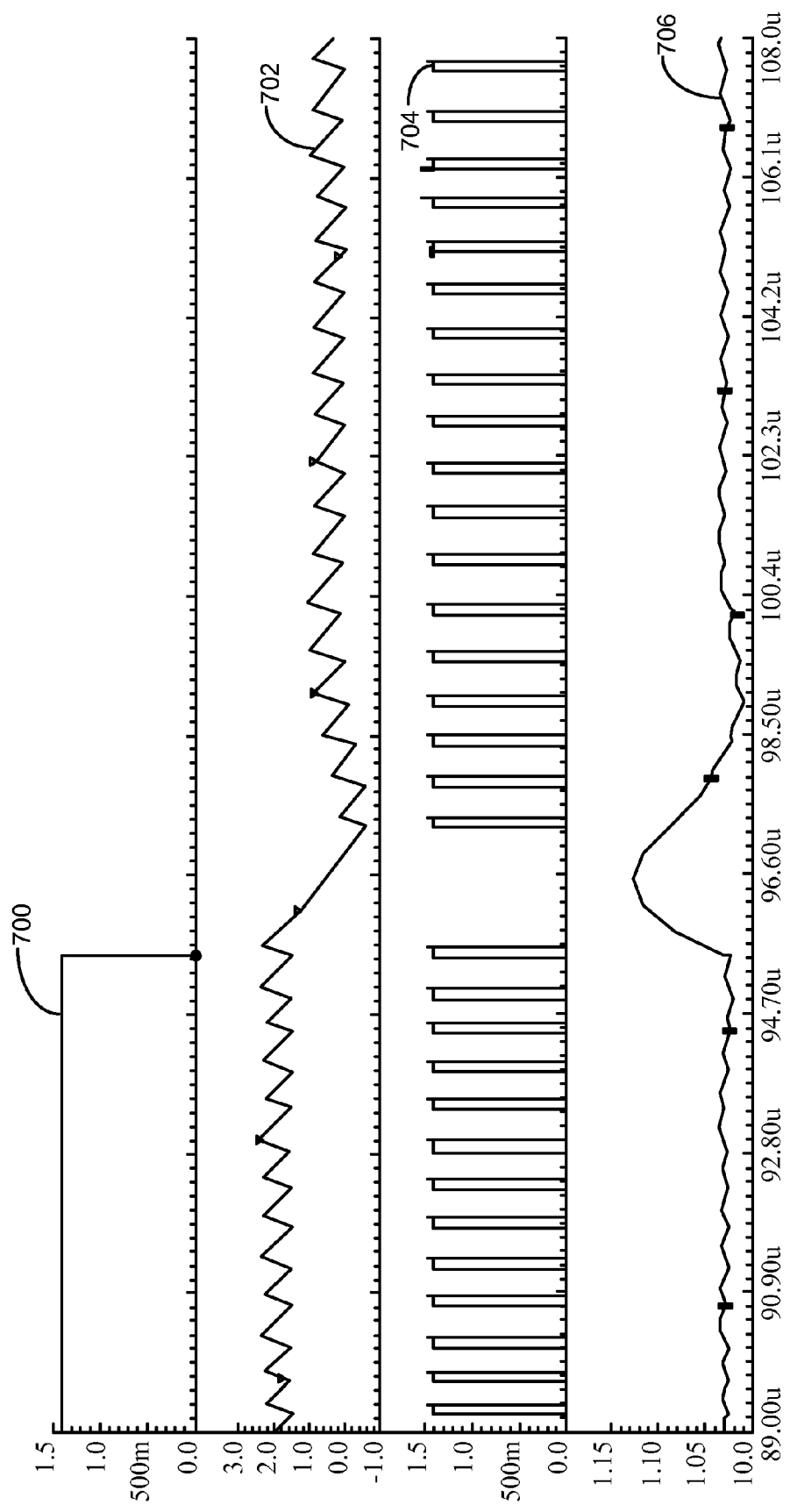

FIGS. 31 and 32 demonstrate dynamic characteristics of device 500 depicted in FIG. 17. FIG. 35 illustrates a light-to-heavy load transient response and FIG. 32 illustrates a heavy-to-light transient response. With reference to FIG. 35, signals 692, 694, 696, and 698 respectively represent a load step current, a current through inductor L, signal δ(t), and output voltage Vout. With reference to FIG. 32, signals 700, 702, 704, and 706 respectively represent a load step current, a current through inductor L, signal δ(t), and output voltage Vout. Again, to minimize the controller reaction time, the delay line is temporarily bypassed upon the initial transient is detected.

Figure 33:
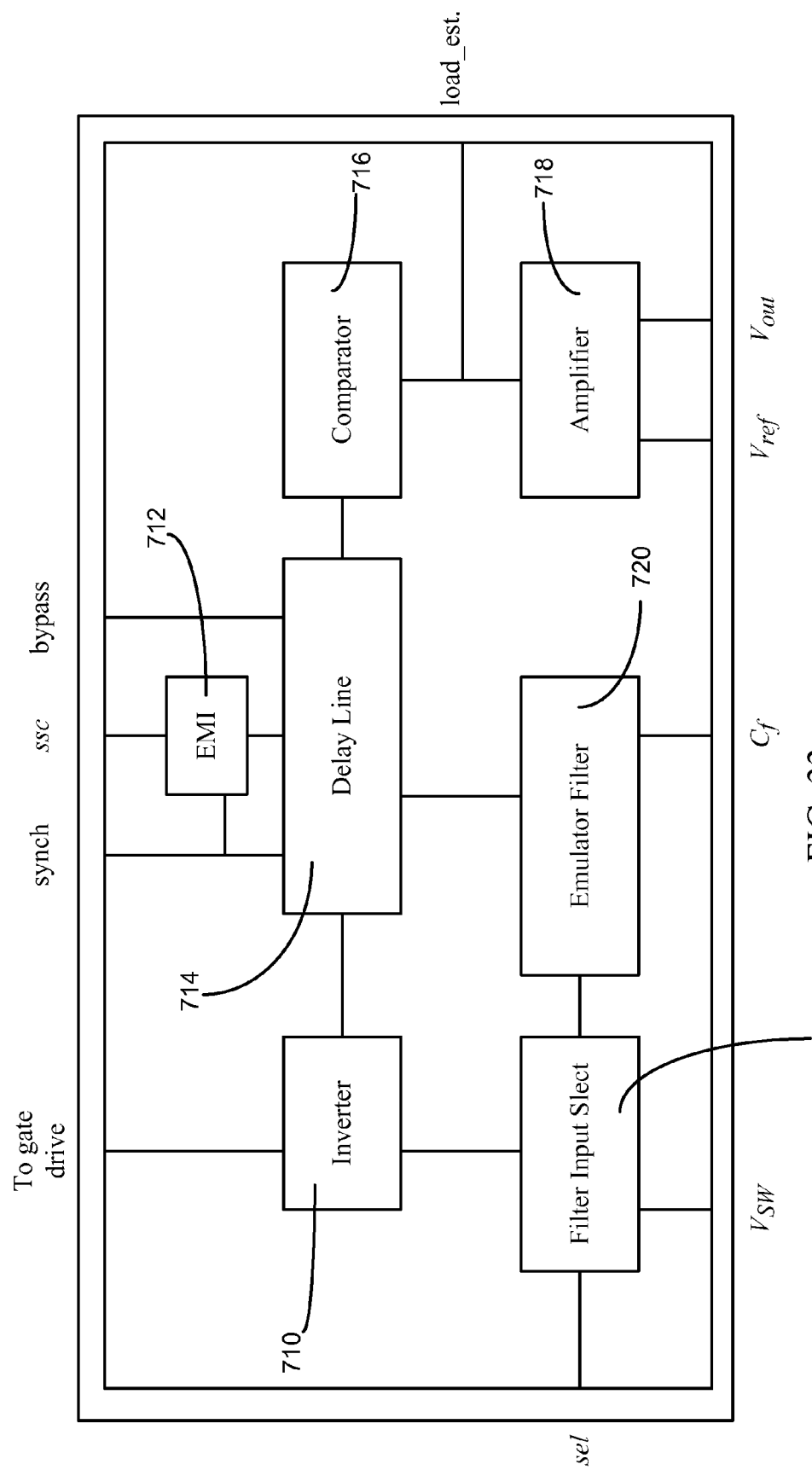
FIG. 33 illustrates a block diagram of an on-chip implementation of a controller, according to an exemplary embodiment of the present invention.

FIG. 33 illustrates a simplified block diagram of a possible on-chip implementation of controllers 302 and 502. In addition to the elements previously discussed, controller 302/502 may include additional blocks and/or input that allow its modification and possible utilization of additional digital features. More specifically, inverter 710 is a rail-to-rail inverter (see FIGS. 3 and 15) used to provide input for the emulator filter during transient conditions and a possible implementation of the voltage droop based control or/and current estimation. Delay line 714 is programmable current starved cells or some other programmable delay structure allowing implementation of EMI reduction techniques and synchronization with an external clock signal. EMI 712 is an optional block for creating spread spectrum signal for minimizing EMI. "Synch" comprises an input for an external synchronization clock. "Ssc" comprises an input for adjustments of EMI 712. "Bypass" comprises an input for bypassing the delay line minimizes delay in the system reaction, improving transient response. As described above, bypassing the delay line improves transient response during transients. Comparator 716 is the comparator of FIGS. 3 and 15. Amplifier 718 is the operational amplifier of FIGS. 3 and 15. Output "load_est" is an output that can be used for monitoring the state of the error signal and, consequently, load estimation in the steady-state. "Vref" and "vout" are two inputs of amplifier 718. Emulator Filter 720 is a part of a complete RCf circuit of the emulator filter. "Cf" comprises is a pin for connecting additional filtering capacitor. Filter input select 722 is configured to select the input for the filter based on the conditions in the circuit. In steady state, to minimize the error, the filter can be fed from the switching node of the converter (FIG. 15). During transients, it can be driven by the inverter (FIG. 3) to minimize delays. "Sel" comprises a control signal for selecting the filter input. "Vsw" comprises an input for the signal coming from the switching node.

It is noted that exemplary embodiments of the present invention may be implemented with an audio power amplifier. As an example, reference voltage Vref (see FIGS. 3 and 15) may comprise an audio signal of the power amplifier.

FIG. 34 is a flowchart illustrating a method 990, in accordance with one or more exemplary embodiments. Method 990 may include amplifying an error voltage comprising a difference between a voltage output from a power stage and a reference voltage (depicted by numeral 992). Method 990 may further include comparing a summation voltage comprising a sum of an amplified error voltage and the reference voltage with an estimated voltage to generate a comparator output signal (depicted by numeral 994). Additionally, method 990 may include generating a gate drive signal from the comparator output signal (depicted by numeral 996). Further, method 990 may include filtering a signal coupled to the power stage to generate the estimated voltage (depicted by numeral 998).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A method, comprising:
   comparing a summation voltage comprising a sum of an error voltage received from a power stage and a reference voltage with an estimated voltage within a controller to generate a comparator output signal;
   generating a gate drive signal from the comparator output signal, the estimated voltage generated within the controller and based on the gate drive signal;
   conveying the gate drive signal from the controller to at least one gate driver of the power stage coupled to an output of the controller; and
   filtering the gate drive signal within the controller to generate the estimated voltage, the filtering the gate drive signal comprising filtering the gate drive signal with a low-pass filter to generate the estimated voltage, wherein the estimated voltage is substantially the same as a voltage output from the power stage.

2. The method of claim 1, further comprising amplifying the error voltage, the error voltage comprising a difference between a voltage output from the power stage and the reference voltage.

3. The method of claim 2, the amplifying an error voltage comprising amplifying an error voltage comprising a difference between a voltage output from a power stage and a time-varying signal.

4. The method of claim 1, further comprising inverting the comparator output signal to generate the gate drive signal.

5. The method of claim 1, further comprising summing the error voltage and the reference voltage to generate the summation voltage.

6. The method of claim 1, further comprising summing a voltage output from the power stage and the reference voltage to generate the error voltage.

7. The method of claim 1, further comprising delaying the comparator output signal to generate the gate drive signal.

8. The method of claim 1, the filtering the gate drive signal comprising filtering the gate drive signal with a low-pass RC filter.

9. The method of claim 1, the comparing a summation voltage comprising comparing the summation voltage comprising a sum of the error voltage and a time-varying voltage with the estimated voltage to generate the comparator output signal.

10. A power converter, comprising:
a controller configured for receiving an output voltage of a power stage, the controller having an output coupled to the power stage and comprising:
a comparator for receiving an estimated voltage and a summation voltage comprising a sum of a reference voltage and an error voltage and outputting a comparator voltage signal; and
a filter coupled to the power stage and configured to filter a gate drive signal conveyed from the controller to at least one gate driver of the power stage and based on the comparator voltage signal to generate the estimated voltage, the estimated voltage generated within the controller and based on the gate drive signal, the filter configured to filter the gate drive signal further configured to filter the gate drive signal with a low-pass filter to generate the estimated voltage, wherein the estimated voltage is substantially the same as a voltage output from the power stage.

11. The power converter of claim 10, further comprising an amplifier having an output coupled to the comparator and configured for amplifying the error voltage, the error voltage comprising a difference between the output voltage and the reference voltage.

12. The power converter of claim 10, further comprising a programmable delay line having an input coupled to an output of the comparator and an output coupled to an input of an inverter.

13. The power converter of claim 10, further comprising an inverter coupled to an output of the comparator for generating the gate drive signal.

14. The power converter of claim 10, the filter comprising a low-pass RC filter.

15. The power converter of claim 10, the controller further comprising an adder for summing the output voltage and the reference voltage to generate the error voltage.

16. The power converter of claim 10, the controller further comprising an adder for summing the error voltage and the reference voltage to generate the summation voltage.

17. The power converter of claim 10, the filter having an input coupled to a gate drive signal generated by the comparator.

18. The power converter of claim 10, the reference voltage comprising a time-varying signal.

19. The power converter of claim 10, the controller comprising a first order emulator of the power stage and the power stage comprising a second order power stage.

20. The power converter of claim 10, the filter comprising a low-pass RC filter.

21. A device, comprising:
means for comparing a voltage comprising a sum of an error voltage received from a power stage and a reference voltage with an estimated voltage within a controller to generate a comparator output signal;
means for generating a gate drive signal from the comparator output signal, the estimated voltage generated within the controller and based on the gate drive signal;
means for conveying the gate drive signal from the controller to at least one gate driver of the power stage coupled to an output of the controller; and
means for filtering the gate drive signal within the controller to generate the estimated voltage, the means for filtering the gate drive signal comprising means for filtering the gate drive signal with a low-pass filter to generate the estimated voltage, wherein the estimated voltage is substantially the same as a voltage output from the power stage.

22. The device of claim 21, further comprising means for amplifying the error voltage, the error voltage comprising a difference between a voltage output from the power stage and the reference voltage.

23. The device of claim 21, further comprising means delaying the comparator output signal to generate the gate drive signal.

24. The device of claim 21, further comprising means for inverting the comparator output signal to generate gate drive signal.

25. The device of claim 21, the means for comparing the voltage comprising a sum of an amplified error voltage and the reference voltage with an estimated voltage comprising means for comparing a voltage comprising a sum of an amplified error voltage and a time-varying voltage with an estimated voltage to generate the comparator output.

* * * * *